US012630255B2

(12) United States Patent
Neperud et al.

(10) Patent No.: US 12,630,255 B2
(45) Date of Patent: May 19, 2026

(54) BICYCLE FRAME STORAGE SYSTEM

(71) Applicant: ENVE Composites, LLC, Ogden, UT (US)

(72) Inventors: Scott M. Neperud, Ogden, UT (US); Navarro Peña Guerra, Salt Lake City, UT (US); Kevin E. Nelson, Salt Lake City, UT (US); Clint L. Child, Ogden, UT (US)

(73) Assignee: ENVE Composites LLC, Ogden, UT (US)

( * ) Notice: Subject to any disclaimer, the term of this patent is extended or adjusted under 35 U.S.C. 154(b) by 970 days.

(21) Appl. No.: 17/827,138

(22) Filed: May 27, 2022

(65) Prior Publication Data

US 2023/0382484 A1 Nov. 30, 2023

(51) Int. Cl.
B62K 19/30 (2006.01)
B62J 9/10 (2020.01)
B62K 19/46 (2006.01)

(52) U.S. Cl.
CPC .................................... B62K 19/30 (2013.01)

(58) Field of Classification Search
CPC .......... B62K 19/30; B62K 19/40; B62K 3/04; B62K 19/46; B62J 7/00; B62J 9/00; B62J 9/10; B62J 9/30; B62J 9/40; B62J 43/28; E01C 1/004; E01C 1/002; E01C 1/04; B62M 6/90; B60R 7/06; B60R 2011/0094; E05C 1/004; E05C 1/002; E05C 1/04
USPC .......... 280/783, 288.3, 288.4; 224/425, 902, 224/544, 412
See application file for complete search history.

(56) References Cited

U.S. PATENT DOCUMENTS

| | | | |
|---|---|---|---|
| 7,819,413 B2 * | 10/2010 | White | B62K 19/40 |
| | | | 280/281.1 |
| 7,854,442 B2 | 12/2010 | Onogi et al. | |
| 8,308,179 B2 | 11/2012 | Cote et al. | |
| 8,727,367 B2 | 5/2014 | Talavesk et al. | |
| 8,727,368 B1 | 5/2014 | Wrobleski | |
| 8,881,857 B2 | 11/2014 | Binggeli et al. | |
| 8,979,110 B2 | 3/2015 | Talavasek et al. | |
| 9,056,646 B1 | 6/2015 | D'Aluisio et al. | |
| 9,403,572 B2 | 8/2016 | Jankura | |
| 9,517,810 B2 * | 12/2016 | Fukumoto | B62K 19/46 |
| 9,580,140 B2 | 2/2017 | Talavasek et al. | |
| 9,580,141 B2 | 2/2017 | Talavasek et al. | |

(Continued)

FOREIGN PATENT DOCUMENTS

| | | |
|---|---|---|
| CN | 206734484 | 12/2017 |
| CN | 208216908 U * | 12/2018 |

(Continued)

OTHER PUBLICATIONS

CN208216908, English translation (Year: 2018).*

*Primary Examiner* — Anne Marie M Boehler

(74) *Attorney, Agent, or Firm* — Rathe Lindenbaum LLP

(57) ABSTRACT

A bicycle may include a frame, a cover and a latch. The frame may include a hollow tube having an interior and an access opening to the interior, wherein the cover closes the access opening. The latch is slidably coupled to the tube and releasably secures the cover to the tube. The latch is movable relative to the tub and the cover between a latched state and an unlatched state, wherein the latch remains coupled to the tube and is disconnected from the cover in the unlatched state.

20 Claims, 19 Drawing Sheets

(56) References Cited

U.S. PATENT DOCUMENTS

| | | | |
|---|---|---|---|
| 9,701,293 | B2 | 7/2017 | D'Aluisio |
| 9,738,347 | B2 | 8/2017 | Talavasek et al. |
| 10,150,530 | B2 | 12/2018 | Lund |
| 10,197,049 | B2 | 2/2019 | Staples |
| 10,710,670 | B2 | 7/2020 | Lund et al. |
| 10,723,407 | B2 | 7/2020 | Adomeit |
| 10,883,481 | B2 | 1/2021 | Staples |
| 2005/0156001 | A1 | 7/2005 | Dal Pra |
| 2006/0232041 | A1 | 10/2006 | Chen |
| 2012/0000313 | A1 | 1/2012 | Zacks |
| 2012/0258779 | A1* | 10/2012 | Ripes ................. B60R 11/0241 |
| | | | 455/575.9 |
| 2014/0116190 | A1 | 5/2014 | Sugii et al. |
| 2014/0175768 | A1 | 6/2014 | Talavasek et al. |
| 2016/0311494 | A1 | 10/2016 | Schiliewert |
| 2019/0002053 | A1 | 1/2019 | Kakinoki |
| 2019/0337587 | A1 | 11/2019 | Hetog |
| 2019/0337588 | A1 | 11/2019 | Wecker et al. |
| 2020/0346708 | A1 | 11/2020 | Moechnig et al. |
| 2021/0016850 | A1 | 1/2021 | Bass et al. |
| 2021/0079903 | A1 | 3/2021 | Staples |
| 2022/0048586 | A1* | 2/2022 | Trif .......................... B62J 43/20 |
| 2023/0406433 | A1* | 12/2023 | Guerra .................. B62K 19/40 |
| 2024/0010288 | A1* | 1/2024 | Lay ............................ B62J 9/10 |

FOREIGN PATENT DOCUMENTS

| | | |
|---|---|---|
| CN | 208576682 | 3/2019 |
| CN | 213057341 | 4/2021 |
| DE | 102009051196 A1 | 5/2011 |
| DE | 102016205539 B3 | 9/2017 |
| EP | 1569856 B1 | 7/2012 |
| EP | 3950813 A1 | 8/2020 |
| JP | 2022035274 | 3/2022 |
| WO | 2012123455 A1 | 9/2012 |
| WO | 2018195677 A1 | 1/2018 |

* cited by examiner

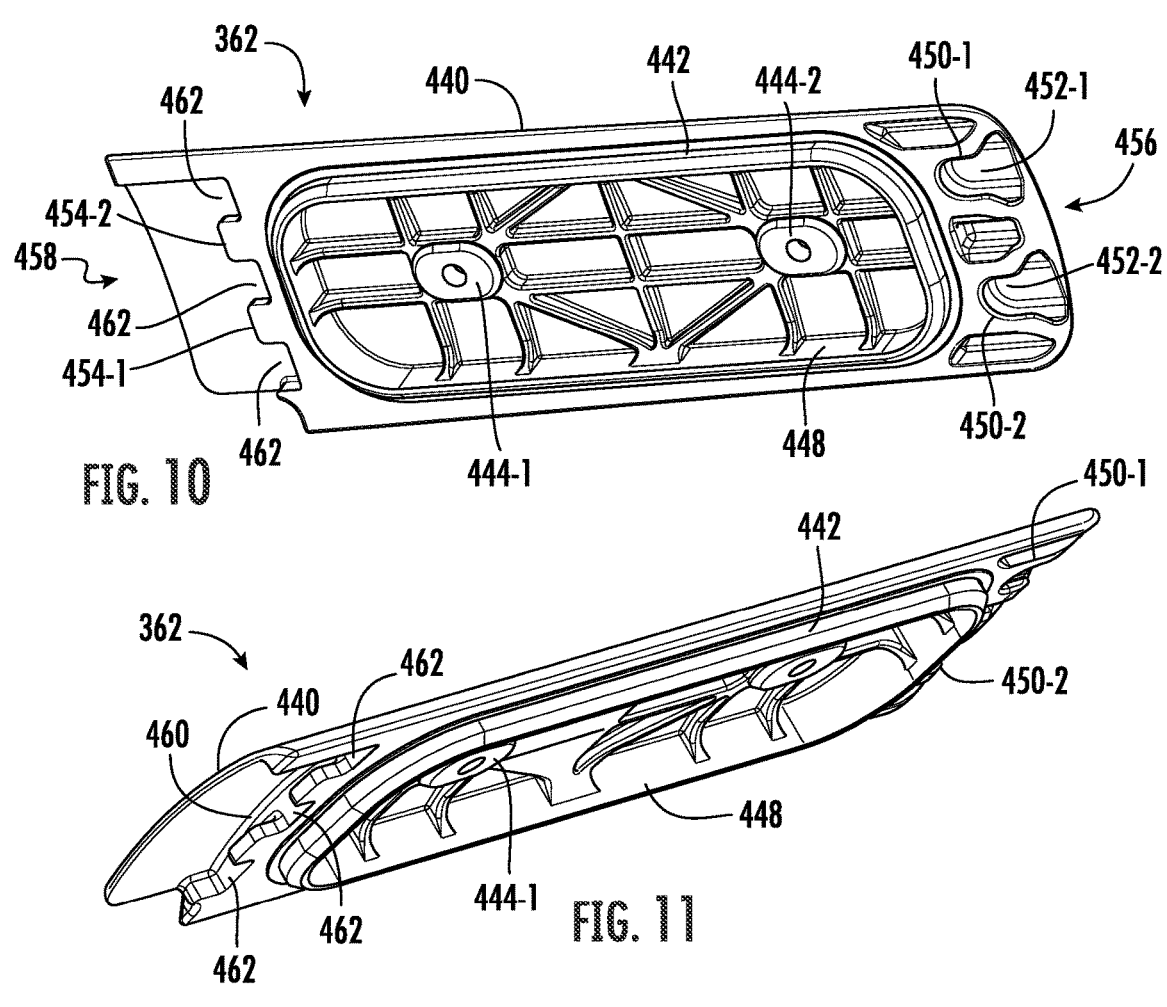
FIG. 10
FIG. 11
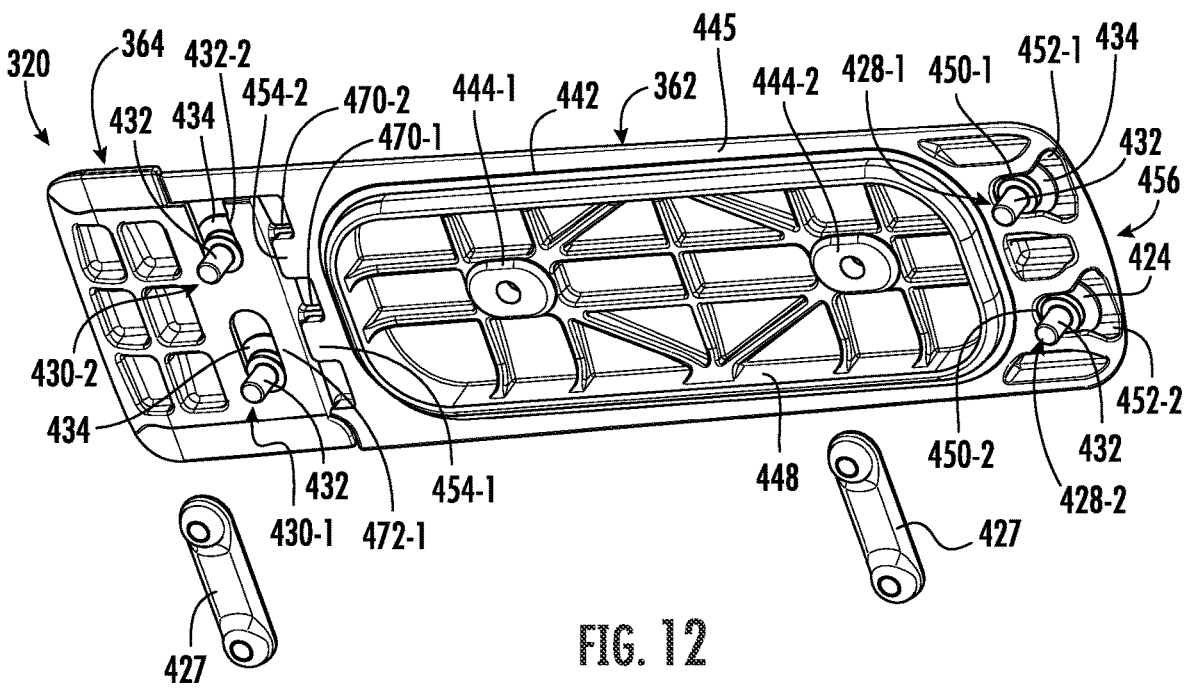
FIG. 12

BICYCLE FRAME STORAGE SYSTEM

BACKGROUND

Bicycles are frequently used for transportation and recreation. Some bicycles may include electrical batteries for powering bicycle electronics or for propelling the bicycle with electric motors. Many bicycles include cables for braking, controlling propulsion of the bicycle such as for switching between different gear ratios and/or for controlling the electric motors. Many bicycles may include external storage systems such as beverage bottle cages, baskets, bags, and racks for storing and carrying items during a bike ride.

BRIEF DESCRIPTION OF THE DRAWINGS

FIG. 10 is a bottom perspective view of the example cover of the bicycle of FIG. 8.

FIG. 11 is a bottom perspective view of the example cover of the bicycle of FIG. 8.

FIG. 12 is a bottom exploded perspective view of the cover, the latch and portions of the tube of the bicycle of FIG. 8.

Figures 1, 2, 3, 4:
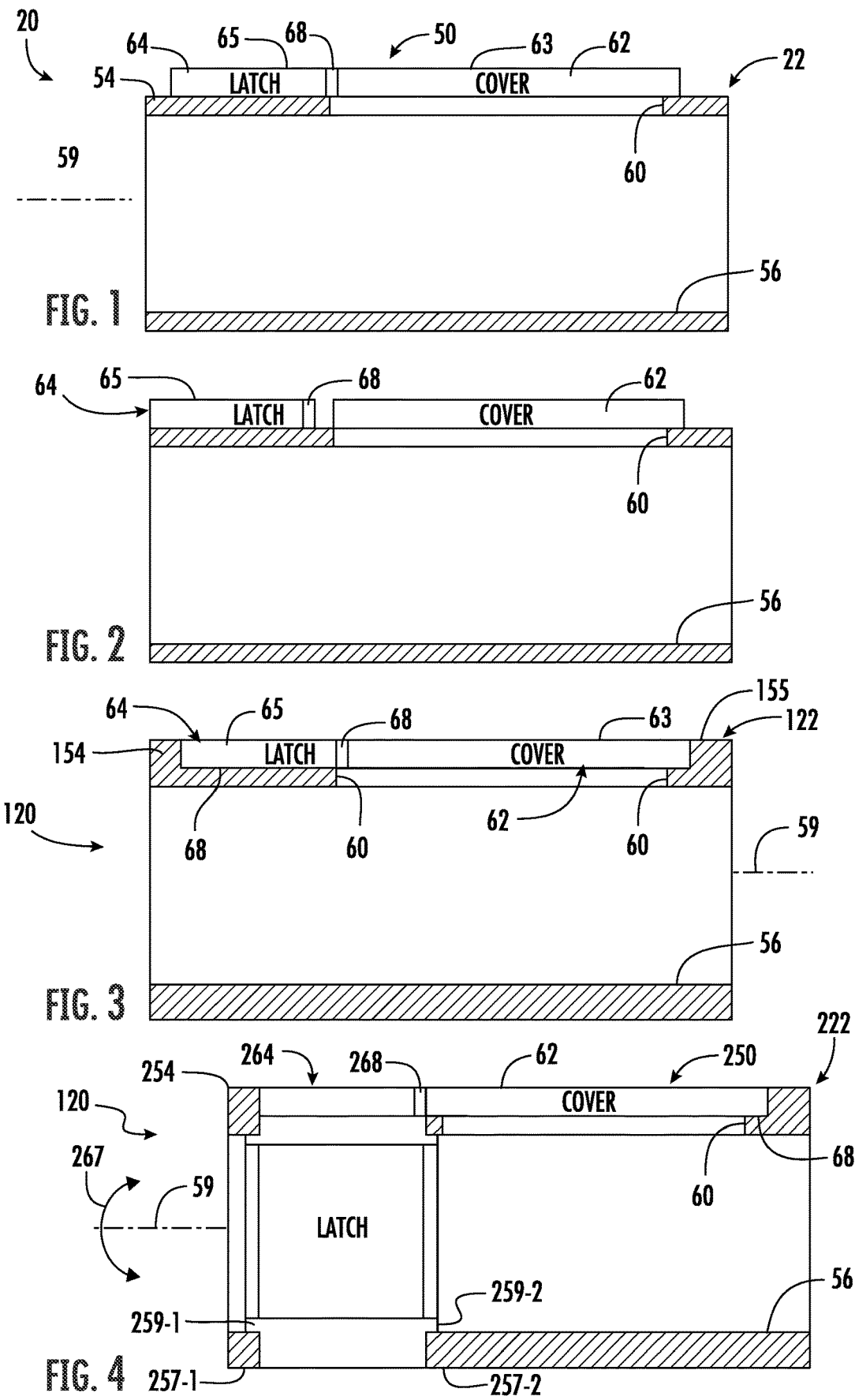
FIG. 1 is a sectional view schematically illustrating portions of an example bicycle having an example storage system with a latch in a latched state.
FIG. 2 is a sectional view schematically illustrating the portions of the example bicycle of FIG. 1 with the latch of the example storage system and an unlatched state.
FIG. 3 is a sectional view schematically illustrating portions of an example bicycle having example storage system with a latch in a latched state.
FIG. 4 is a sectional view schematically illustrating portions of an example bicycle having an example storage system with a latch in a latched state.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example bicycles that utilize an interior of an existing hollow tube of a bicycle frame for internal storage. The internal storage is accessed through an access opening which is closed by a cover. A latch releasably secures the cover to the tube. The latch remains coupled to the tube and is disconnected from the cover while the internal storage is being accessed. Because the latch remains coupled to the tube during such storage access and is not part of the cover, the latch may be integrated as part of the bicycle frame and construction of the cover is simplified.

In some implementations, the latch and adjacent portions of the surrounding tube have corresponding exterior surface shapes, wherein the latch is at least partially recessed such that its exterior surfaces are flush with exterior surfaces of the tube when the latch is in a latched state. In some implementations, the latch and adjacent portions of the cover have corresponding exterior surface shapes, wherein the latch and the cover are flush when the latch is in a latched state. As a result, the tube of the bicycle providing the internal storage maintains a sleek and aerodynamic construction and appearance despite the inclusion of the cover and latch.

In some implementations, the latch is slidable relative to the cover in a direction perpendicular to a longitudinal axis of the tube between a latched state and an unlatched state. In some implementations, the latch is rotatable relative to the tube between a latched state and an unlatched state. In some implementations, latch may comprise a cylinder which encircles the tube. Such constructions may facilitate a flush relationship between the exterior surfaces of the latch, the cover and/or the tube and may facilitate a less complex cover construction.

Disclosed are example bicycles that utilize an interior of an existing hollow tube of a bicycle frame to route bicycle cables while also allowing the interior to be used for internal storage. The example bicycles comprise a cable retainer that is to be positioned within the interior of the hollow tube. The cable retainer comprises a panel that wraps about one or more cables within the tube and retains the one or more cables along an interior side of the tube to provide unencumbered storage alongside the panel.

In some implementations, the panel may have a first portion secured to an inside of the tube, and a second portion that pivots relative to the first portion between a first position inside the tube and a second position adjacent the first portion, wrapped about the cable. Such a construction may facilitate easier access to the internally routed cables. In some implementations, the second portion may include a pocket or pouch for containing items to be stored inside the tube.

In some implementations, the panel is adhesively secured adjacent to the interior surface of the tube. In some implementations, the panel is retained in a wrapped state about the cable with a hook and loop fastener.

In some implementations, an article, such as a tool or key, may be tethered to the panel. In some implementations, the tether may be sufficiently long to allow the article to be removed from the interior the tube while remaining tethered to the panel. In some implementations, the panel is removably coupled or secured within the interior the tube such the panel in the tethered article may be removed from the interior of the tube. In some implementations, a tether may extend from the panel and have a connector for releasably connecting to a pouch, a tool or other article. In some implementations, the tether may be sufficiently long such that the connector may be withdrawn from the tube to facilitate disconnection of the article from the tether or connection of an article to the tether.

Disclosed are example bicycles that comprise a frame, a cover and a latch. The frame may include a hollow tube having an interior and an access opening to the interior, wherein the cover closes the access opening. The latch is movably coupled to the tube and releasably secures the cover to the tube. The latch is movable relative to the tube and the cover between a latched state and an unlatched state, wherein the latch remains coupled to the tube and is disconnected from the cover in the unlatched state.

Disclosed are example bicycles that comprise a frame comprising a hollow tube having an interior, a cable passing through the interior, and a cable retainer within the interior. The cable retainer may include a flexible panel, in a closed state, wrapped about the cable, and a connector releasably securing the flexible panel in the closed state.

Disclosed are example bicycles that comprise a frame having a hollow tube with an interior and an access opening to the interior, wherein a cover closes the access opening. A latch is movably coupled to the tube and releasably secures the cover to the tube. The latch is slidable relative to the cover in a direction perpendicular to a longitudinal axis of the tube between a latched state and unlatched state.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

For purposes of this disclosure, the phrase "configured to" denotes an actual state of configuration that fundamentally ties the stated function/use to the physical characteristics of the feature proceeding the phrase "configured to".

For purposes of this disclosure, the term "releasably" or "removably" with respect to an attachment or coupling of two structures means that the two structures may be repeatedly connected and disconnected, or coupled and decoupled, to and from one another without material damage to either of the two structures or their functioning.

Bicycle 20

Figure 5:
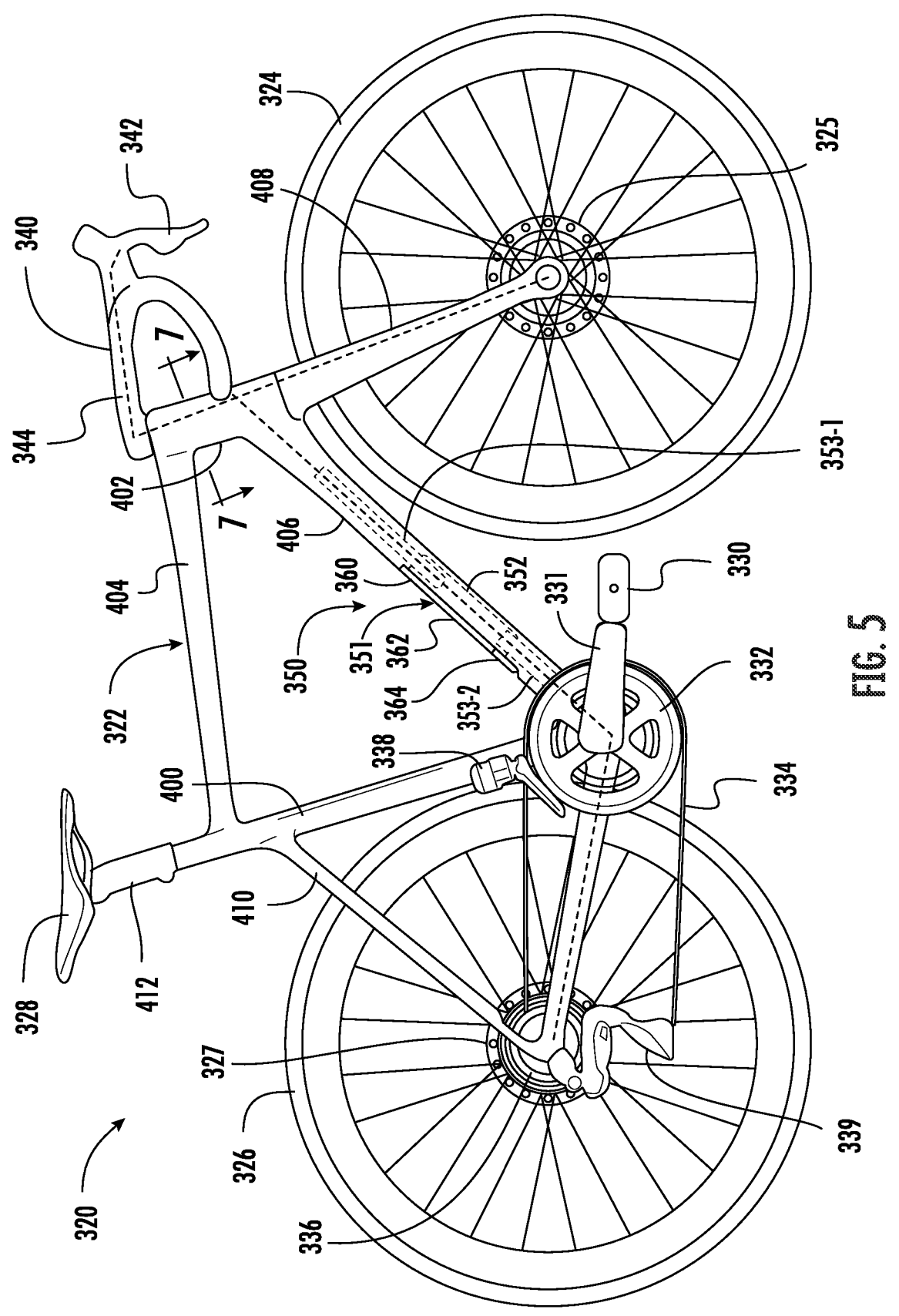
FIG. 5 is a side view of an example bicycle.

FIGS. 1 and 2 are sectional views schematically illustrating portions of an example bicycle 20. Bicycle 20 comprises frame 22 and storage system 50. Frame 22 supports the remaining components of bicycle 20 such as its pedals, handlebars, seat, gears, wheels and the like (examples of which are shown in FIG. 5). Frame 22 comprises a hollow tube 54 having a hollow interior 56 which may be accessed for storage using storage system 50. In some implementations, tube 54 and interior 56 have a circular cross-section. In some implementations, tube 54 and interior 56 have a non-circular cross-sectional shape, such as an oval or polygonal cross-sectional shape. In some implementations, tube 54 comprises a down tube of bicycle 20. In yet other implementations, tube 54 may comprise other portions of the frame 22 of bicycle 20, such as a seat tube, a cross or top tube, a head tube, or other tubes or posts of bicycle 20.

Storage system 50 facilitates storage of articles, such as clothing, food, tools or supplies, within interior 56. Storage system 50 comprises access opening 60, cover 62 and latch 64. Access opening 60 comprise an opening through the outer side wall of tube 54, the opening being sufficiently sized to facilitate the manual insertion of items into interior 56. In one implementation, access opening 60 has an axial length (at its longest extent) extending along a centerline of tube 54 of at least 2 inches and a transverse width (at its widest extent) of at least 1 inches. In some implementations, access opening 60 extends along a top side of tube 54, facing upwardly. In some implementations, access opening 60 extends along a side of tube 54.

Cover 62 comprise a panel or other structure closing access opening 60. Cover 62 is configured to be moved to uncover and expose axis opening 60 for the insertion of articles into interior 56. In some implementations, cover 62 seals access opening 60 to inhibit the ingress of water, dirt or other contaminants into interior 56. In some implementations, cover 62 may be tethered to tube 54, wherein cover 62 remains attached to tube 54, hanging from tube 54 or otherwise offset from access opening 60 to uncover access opening 60. In some implementations, cover 62 is completely separable or withdrawable from tube 54 when access opening 60 is uncovered for insertion of articles into interior 56. In the example illustrated, cover 62 projects above the outer exterior surface of tube 54.

Latch 64 is movably coupled to tube 54 and releasably secures cover 62 to tube 54. Latch 64 moves relative to the tube and the cover between a latched state and an unlatched state. When in the unlatched state, latch 64 remains coupled to the tube 54 and is disconnected from cover 62. In some implementations, latch 64 slides between the latched and unlatched state. Latch 64 slides relative to cover 62 in a direction perpendicular to a longitudinal axis 59 of tube 54. In some implementations, latch 64 rotationally slides about tube 54 when moving from the latched state to the unlatched state and vice versa.

FIG. 1 illustrates latch 64 in a latched state, engaging cover 62 to releasably secure cover 62 to tube 54 and over access opening 60. FIG. 2 illustrates latch 64 in an unlatched state, disengaged from cover 62. As a result, cover 62 may be moved to a position in which cover 62 does not cover access opening 60 or only partially covers access opening 60 such that articles may be inserted into interior 56 of tube 54. In some implementations, cover 62 may be lifted and/or pivoted out of connection with tube 54 without any resistance from latch 64. As discussed above, in some implementations, cover 62 may be tethered to tube 54. In some implementations, cover 62 may be completely separated from tube 54. In the unlatched state, latch 64 remains coupled to the tube 54 and is disconnected from the cover 62 while the internal storage is being accessed. Because the latch 64 remains coupled to the tube 54 during such storage access and is not part of the cover 62, the latch 64 may be integrated as part of the bicycle frame 22 and construction of the cover 62 is simplified.

As schematically illustrated, in one example implementation, latch 64 comprises a cover engagement portion 68 which engages cover 62 in the latched state to retain cover 62 in place to tube 54 and over access opening 60. Latch 64 may be moved to reposition cover engagement portion 68 such that cover 62 may be lifted and/or pivoted out of engagement with latch 64 such that cover 62 may be moved to open access opening 60. In one example implementation, cover engagement portion 68 may be slid to a latching position which cover engagement portion 68 overlies a projecting portion of cover 62, preventing cover 62 from being lifted away from tube 254. Cover engagement portion 68 may be further slid to an unlatched position in which cover engagement portion 68 no longer overlies the projecting portion of cover 62 such that cover 62 may be lifted away from tube 254.

In the example illustrated, cover 62 has an exterior surface 63 while latch 64 has an exterior surface 65. Surfaces 63 and 65 are flush with one another when cover 62 is an axis opening covering position and when latch 65 is in a latched state. For purposes of this disclosure, two adjacent surfaces described as being "flush" with one another means that the adjacent surfaces have edges that are identical in shape and that abut one another edge-to-edge at the same height or three-dimensional coordinates in space, providing an otherwise smooth continuous surface but for any gap or seam between the abutting edges of the adjacent surfaces. Surfaces 63 and 65 are not flush with the outer exterior surface of tube 54. In other implementations, surfaces 63 and 65 may not be flush with one another such as when such surfaces have different shapes or profiles or such as when such adjacent surfaces project above or from tube 54 by different extents.

Bicycle 120

FIG. 3 a sectional view schematically illustrating portions of an example bicycle 120. FIG. 3 illustrates an example of how a latch and cover of a storage system may be provided with exterior surfaces that are flush with adjacent exterior surfaces of a bicycle tube to maintain the sleek and aerodynamic profile of the bicycle tube and frame. Bicycle 120 is similar to bicycle 20 described above except that bicycle 120 comprises a frame 122 having a tube 154. The remaining components of bicycle 120 which correspond to components of bicycle 20 are numbered similarly.

Tube 154 is similar to tube 54 except that tube 154 comprises a recessed portion 68 adjacent to and about access opening 60. Recessed portion 68 is sized and located such that those portions of exterior surface 63 of cover adjacent to the exterior surface 155 of tube 154 are flush with exterior surface 155. Recessed portion 68 is sized and located such that those portions of exterior surface 65 of latch adjacent to exterior surface 155 of tube 154 are flush with exterior surface 155. In the example illustrated, adjacent portions of the exterior surfaces 63 and 65 are also flush with one another.

As with bicycle 20, latch 65 moves between a latched state and unlatched state while remaining coupled to the tube. In the unlatched state, latch 65 is disconnected from cover 62, such that cover 62 may be moved or repositioned so as to uncover access opening 60, permitting access to interior 56 of tube 154. Because adjacent exterior surfaces of the latch and the cover are flush with one another and with adjacent exterior surface portions of tube 154 when the latch 64 is in a latched state, frame 122 maintains a sleek and aerodynamic construction and appearance despite the inclusion of the cover 62 and latch 64.

Bicycle 220

FIG. 4 is a sectional view schematically illustrating portions of an example bicycle 220. FIG. 4 illustrates an example of how a latch may be rotated about an axis of a bicycle tube between a cover latching position or state and a cover unlatching or unlatched position or state. Bicycle 220 comprises frame 222 and storage system 250.

Frame 222 comprises tube 254. As with tube 154, tube 254 has an interior 56 and recessed portion 68. In the example illustrated, tube 254 has a section removed to receive and guide a latch of storage system 250.

Storage system 250 comprises access opening 60 and cover 62 (described above). Storage system 250 further comprises latch 264. Latch 264 is configured to rotate about axis 59 in the direction indicated by arrows 267 between a latched state and an unlatched state. Latch 264 is fit between tube portions 257-1 and 257-2 (collectively referred to as to portions 257). In the example illustrated, latch 264 comprises projecting annular bosses 259-1 and 259-2 (collectively referred to as bosses 259) which are slidably fit within tube portion 257-1 and 257-2, respectively. Bosses 259 interact with tube portions 257 to secure latch 264 in place between tube portions 257 and to guide rotation of latch 264 about axis 65 as indicated by arrows 267.

As schematically illustrated, latch 264 comprises a cover engagement portion 268 which engages cover 62 in the latched state to retain cover 62 in place to tube 254 and over access opening 60. Latch 264 may be rotated about axis 59 to move cover engagement portion 268 such that cover 62 may be lifted and/or pivoted out of engagement with latch 264 such that cover 62 may be moved to open access opening 60. In one example implementation, cover engagement portion 68 may be rotatable to a latching position which cover engagement portion 68 overlies a projecting portion of cover 62, preventing cover 62 from being lifted away from tube 254. Portion 68 may be rotatable to an unlatched position in which cover engagement portion 68 no longer overlies the projecting portion of cover 62 such that cover 62 may be lifted away from tube 254.

Bicycle 320

FIG. 5 is a side view illustrating an example bicycle 320. FIG. 5 illustrates an example of a bicycle that includes cables routed through a tube of the bicycle, wherein the tube includes an access opening having a cover which is secured by a latch, a cable retainer which manages the cables within the tube and one or more tube pouch(es), which is/are inserted within the tube through the access opening. Bicycle 320 comprises a frame 322, a front wheel 324, a front disc brake system 325, a rear wheel 326, a rear disc brake system 327, a seat 328, a pair of pedals 330 supported by a pair of crank arms 331, one or more front sprockets 332, a gear chain 334, rear sprockets 336, a front derailleur 338, a rear derailleur 339, handlebars 340, a pair of braking-shifting levers 342, internal cabling 344, and a storage system 350 comprising tube storage 351, a cable retainer 352 and one or more tube pouches 353.

Figures 6, 7, 8:
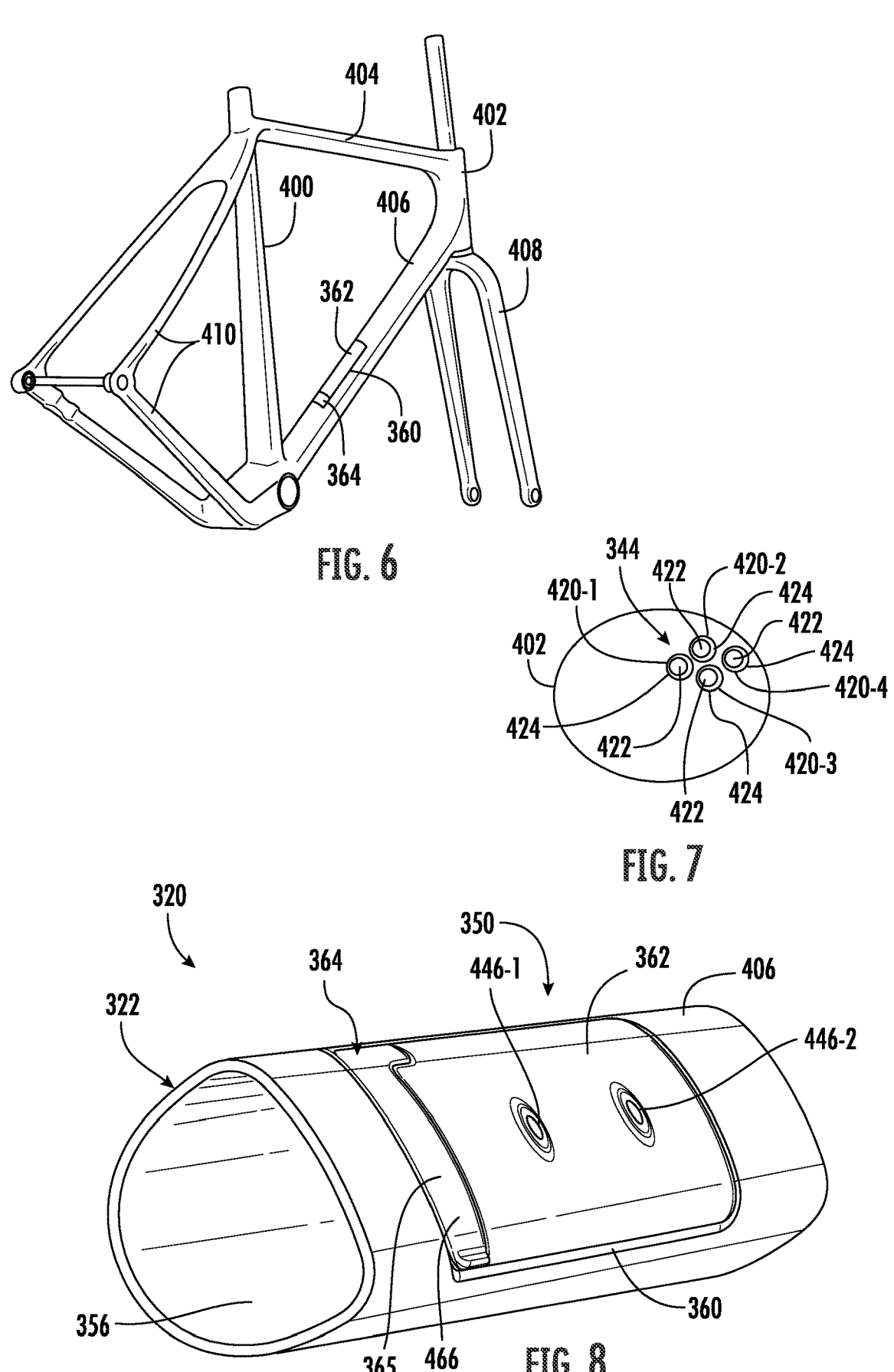
FIG. 6 is a rear perspective view of an example frame of the bicycle of FIG. 5.
FIG. 7 is a cross-sectional view of the bicycle of FIG. 5 taken along line 7-7.
FIG. 8 is a fragmentary perspective view of a portion of the bicycle of FIG. 5 illustrating an example tube and tube storage having an example cover and an example latch in a latched state.

Frame 322 supports the remaining components of bicycle 320. FIG. 6 illustrates frame 322 isolated from the remaining components of bicycle 320. Frame 322 comprises a seat tube 400, a front or head tube 402, a top or cross tube 404, a down tube 406, a fork 408 and a set of rear struts 410. Seat tube 400 supports a seat post 412, which supports seat 328. Head tube 402 supports handlebars 340 and fork 408. Cross tube 404 and down tube 406 extend between seat tube 400 and head tube 402. Fork 408 is rotatably coupled to head tube 402 and supports front wheel 324. Rear struts 410 extend rearwardly from seat tube 400 and support rear wheel 326. Some of the various components forming frame 322 may be integrally formed as a single unitary body or may be layed-up and cured, welded or otherwise joined to one another. Each of such tubes or structures forming frame 322 may have cylindrical or non-cylindrical shapes. Each such tubes or structures may be hollow to reduce weight.

Front wheel 324 is rotatably supported by fork 408. Front disc brake system 325 is supported by fork 408 and is actuatable by cabling 344 to retard the rotation of or brake front wheel 324. Rear wheel 326 is rotatably supported by rear struts 410. Rear disc brake system 327 is supported by rear struts 410 and is actuatable by cabling 344 to retard the rotation of or brake rear wheel 326. In other implementations, other braking system may be employed which are actuated by other forms of cabling 344. For example, in other implementations, bicycle 320 may utilize front and rear brakes which include brake pads or bars that are selectively controlled to squeeze against the rims of wheel 324, 326 to brake their respective rotation.

Seat 328 is supported by seat post 412. Pedals 330 are connected to sprockets 332 by crank arm 331. Front sprockets 332 comprise a single sprocket or gear, or a set of differently sized gears or sprockets which are rotatably supported by frame 322. Front sprockets 332 are configured to be rotated by the rotation of pedals 330, by rider, about the axis of sprockets 332. Gear chain 332 is selectively connected one of the front sprockets 332 and is selectively connected to one of rear sprockets 336. Rear sprockets 336 are connected to the hub of rear wheel 326 such that rotation of the rear sprockets 336 rotates rear wheel 326. The particular sprockets connected by gear chain 334 determines the speed or gear ratio of bicycle 320. Gear chain 332 transmits motion and torque from the selected one of front sprockets 332 to the selected one of rear sprockets 336 to propel rear wheel 326.

Front derailleur 338 selectively connects gear chain 334 to a selected one of the different gear wheels or sprockets of front sprockets 332. Front derailleur 338 shifts gear chain 334 from one gear wheel or sprocket to another gear wheel or sprocket of front gear will 332. Front derailleur 338 many actuated by a rider via cabling 344.

Rear derailleur 339 selectively connects gear chain 334 to a selected one of the different gear wheels or sprockets of rear sprockets 336. Rear derailleur 339 shifts gear chain 334 from one gear wheel or sprocket to another gear wheel or sprocket of rear sprockets 336. Rear derailleur 339 may be actuated by a rider via cabling 344.

Handlebars 340 are supported by front or head tube 402 of frame 322. Brake-shift levers 342 are movably supported by handlebars 340 and are operably coupled to cabling 344. Break-shift levers 342 may be located on each of the right and left sides of handlebars 340. Brake-shift levers 342 are manually actuatable to pull or push individual cables of cabling 344 so as to individually actuate brake systems 325, 327 and individually actuate or move derailleur 338, 339 depending upon which of the particular ones of levers 342 are moved.

Cabling 344 comprises one or more individual cables which are internally routed within portions of frame 322 to various components or systems of bicycle 320 for selectively actuating such components of bicycle 320. In the example illustrated, the individual cables of cabling 344 comprises brake and gear cables used to selectively actuate front braking system 325, rear braking system 327, front derailleur 338 and/or rear derailleur 339. In other implementations, cabling 344 may be used to actuate other components of a cycle or vehicle.

FIG. 7 is a cross-sectional view through front or head tube 402 taken along line 7-7 of FIG. 5. FIG. 7 illustrates the internal routing of cabling 344 within front tube 402. In the example illustrated, cabling 344 comprises four individual cables 420-1, 420-2, 420-3 and 420-4 (collectively referred to as cables 420). Cable 420-1 is connected to a first braking lever of levers 342 and controls front disc braking system 325. Cable 420-2 is connected to a second braking lever of levers 342 and controls rear disk braking system 327. Cable 420-3 is connected to a first gear shift lever of levers 342 and controls front derailleur 338. Cable 420-4 is connected to a second gear shift lever of levers 342 and controls rear derailleur 339. In the example illustrated, each of cables 420 comprises a Bowden cable, such as an inner cable 422 of twisted steel wire that runs through an outer sleeve 424, extending from the bicycle's control levers on the handlebar to the brakes or derailleurs.

As shown by FIGS. 5 and 7, the different cables 420 of cabling 344 may be differently routed through different portions of frame 322. Cable 420-1 is routed within handlebar 340, through front tube 402 and through fork 408 to front disc braking system 325. Cable 420-2 extends within handlebar 340, through front tube 402, through down tube 406 and through rear struts 410 to rear disc braking system 336. Cable 420-3 is routed within handlebar 340 and through down tube 406 to front derailleur 338. Cable 420-4 is routed through handlebar 340, through down tube 406 and through rear strut 410 to rear derailleur 339. In some implementations, certain portions of each of cables 420 may alternatively be routed along a side or exterior of certain portions of frame 322.

Storage system 350 utilizes an interior of an existing hollow tube of frame 322 for internal storage. In the example illustrated, storage system 350 provides an internal storage volume within down tube 406. Storage system 350 comprises tube storage 351, cable retainer 352, and tube pouches 353. Tube storage 351 facilities the storage of articles or containers, such as pouches 353, within the interior of a bicycle frame. Tube storage 351 comprises access opening 360, cover 362 and latch 364.

Figure 9:
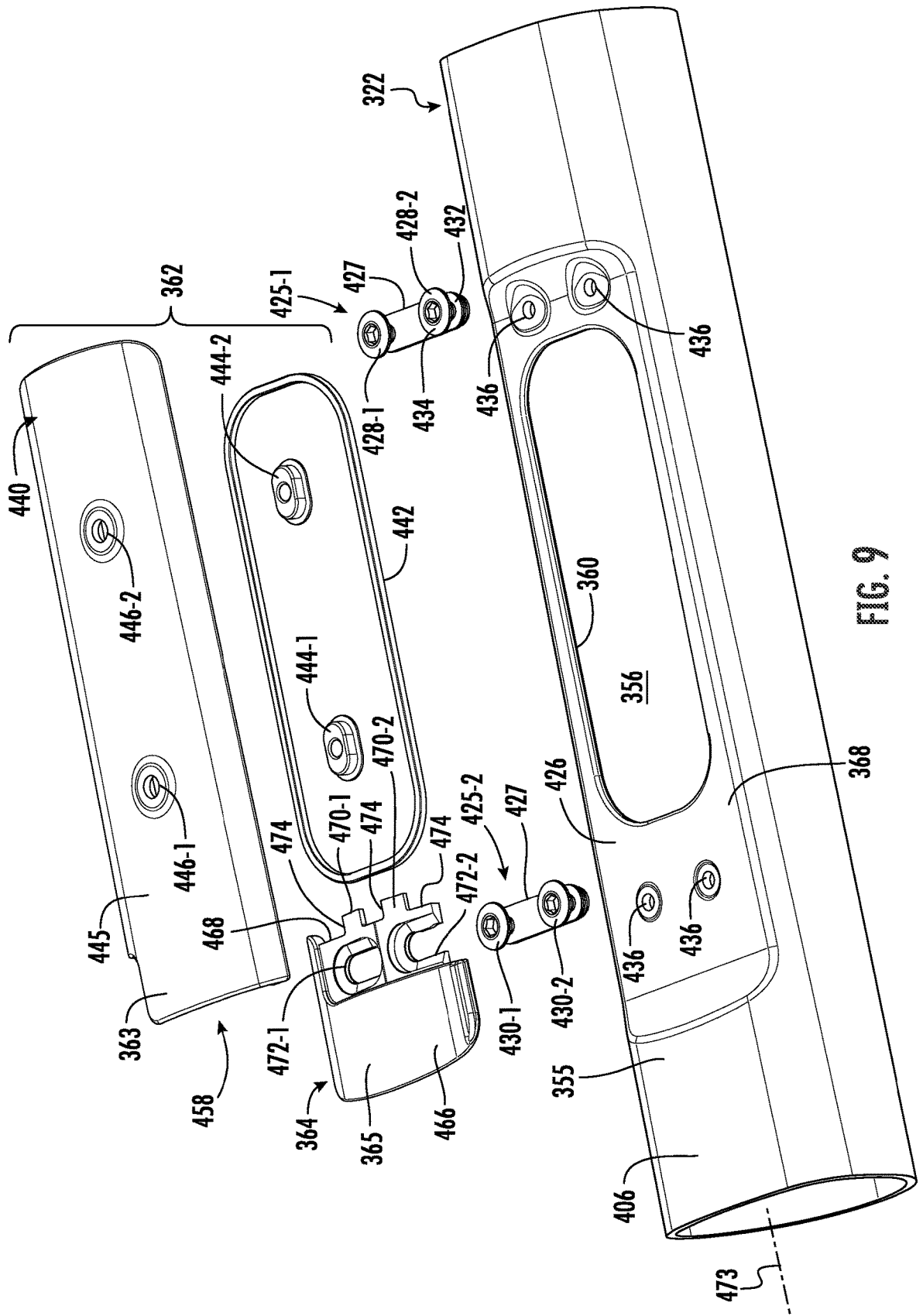
FIG. 9 is an exploded perspective view of the portion of the example bicycle of FIG. 8.
Figure 13:
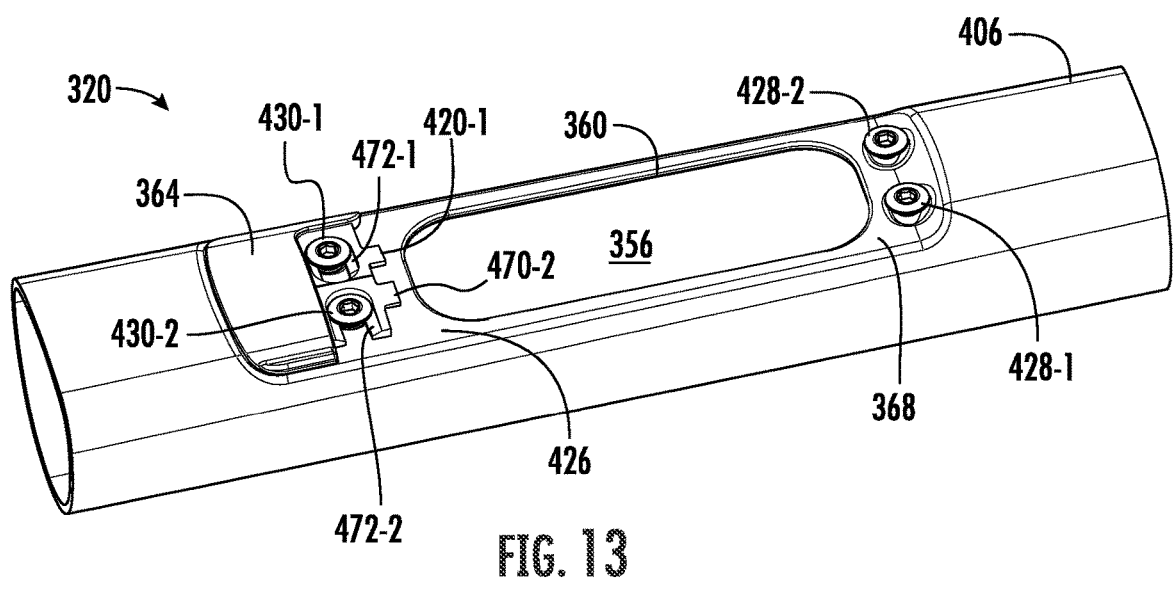
FIG. 13 is a top perspective view of the portions of the bicycle of FIG. 8 illustrating the latch in a latched state without the cover.
Figure 14:
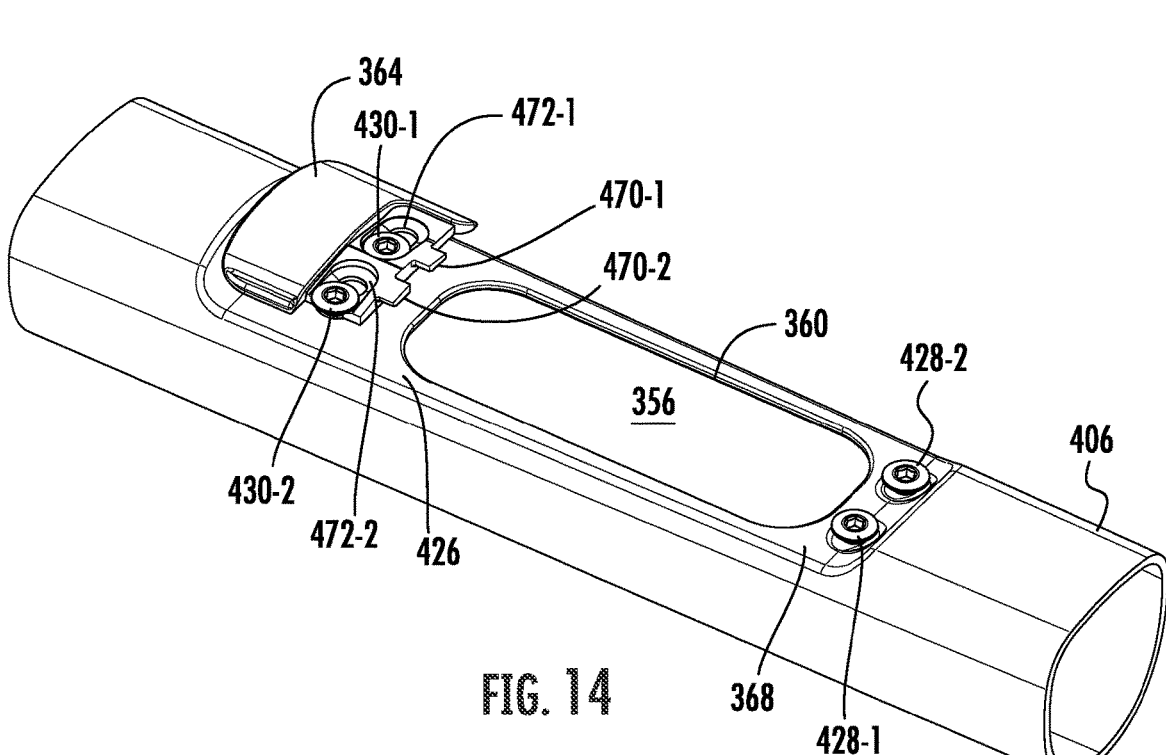
FIG. 14 is a top perspective view of the portions of the bicycle of FIG. 8 illustrating the latch in an unlatched state without the cover.

FIGS. 8-18 illustrate portions of bicycle 320 with an emphasis on tube storage 351 of storage system 350. As shown by FIGS. 8 and 9, access opening 360 extends through down tube 406 of frame 322 along a top side of down tube 406. As shown by FIG. 8, down tube 406 has a non-circular cross-sectional shape having a rounded lower surface profile and a flattened upper surface profile. The flattened upper surface profile facilitates a wider cover 362 and a wider access opening 360 for accessing interior 356 of tube 406.

As shown by FIG. 9, the upper side of tube 406 comprises a recessed portion 368 through which access opening 360 extends and a pair of knob sets 425-1 and 425-2 (collectively referred to as knob sets 425). Recessed portion 368 has a flat landing 426 which may offer an enhanced seal with respect to cover 362. As shown by FIG. 8, recessed portion 368 receives cover 362 such that adjacent exterior surface portions of cover 362 may be flush with those exterior surface portions 355 that extend about recessed portion 368. Recessed portion 368 further receives latch 364 such that adjacent exterior surface portions of latch 364 may be flush with those exterior surface portions 355 that extend about recessed portion 368. The exterior profiles or shapes of cover 362 and latch 364 are further similar to or correspond to the exterior surface profile the shapes of those portions of tube 406 about recessed portion 368 such that the adjacent exterior surfaces having abutting edges are flush with one another. In addition, the adjacent surface portions of cover 362 and latch 364 which have abutting edges also have similar surface shapes or profiles such that such surfaces are flush with one another. As a result, the sleek and aerodynamic instruction of down to 406 of frame 322 is maintained and the provision of tube storage 351 may be imperceptible but for the seams between the adjacent components.

Knob sets 425-1 and 425-2 are mounted to landing 426 and are configured to interact with cover 362 and latch 364, respectively. Each of knob sets 425 comprises a bridge plate 427 supporting a pair of bolts or knobs. Knob set 425-1 comprises knobs 428-1, 428-2 (collectively referred to as knobs 428). Knob set 428-2 comprises a bridge plate 427 and knobs 430-1, 430-2 (collectively referred to as knobs 430).

Each of knobs 428, 430 comprises a shaft portion 432 and a wider head portion 434. Shaft portion 432 extends from head portion 434 is externally threaded. In the example illustrated, each shaft portion 432 extends through an opening 436 formed in landing 426 and is threaded into internally threaded bores of bridge plate 427 which underlies the landing 426 of tube 406, mounting knob sets 425 to tube 406. In other implementations, knobs 428, 430 may be mounted or otherwise secured to tube 406 using other fasteners or secured in other fashions. For example, in some implementations, knobs 428, 430 may be welded, bonded or otherwise affixed directly to landing 426 of tube 406. In some implementations, knobs 428, 430 may be integrally formed as part of a single unitary body with tube 406.

Cover 362 covers and closes access opening 360. As discussed above and as shown FIG. 8, cover 362 is sized and has an outer surface shape or profile such that when it is received within recessed portion 368, the exterior surfaces of cover 362 are flush with adjacent exterior surfaces of latch 364 and both portions of tube 406 about recessed portion 368. As shown by FIG. 9, cover 362 comprises cover panel 440, gasket 442 and internally threaded cover inserts 444-1, 444-2 (collectively referred to as inserts 444).

Cover panel 440 is received within and together with latch 364 fills recessed portion 368. Cover panel 430 has an upper wall 445 with an exterior surface 363 that has a shape which corresponds to the shape of adjacent surfaces of latch 364 and tube 406. In the example illustrated, cover panel 440 comprises a pair of openings 446-1, 446-2 through which accessory connectors may extend and may be mounted. For example, in some implementations, a beverage bottle cage may be mounted to an above cover panel 440 with a pair of bolts extending through openings 446 into connection with inserts 444.

As shown by FIGS. 10-12, the lower surface or face of cover panel 440 is configured to partially fit within access opening 360 and to interact with and releasably engage portions of latch 364. The underside of cover panel 440 comprises lower wall 448, slots 450-1, 450-2 (collectively referred to as slots 450), passages 452-1, 452-2 (collectively referred to as passages 452), and latch engaging tabs 454-1, 454-2 (collectively referred to as tabs 454). Lower wall 448 projects downwardly, perpendicular to, upper wall 445. Lower wall 448 has a shape corresponding to the shape of access opening 360 and is sized to be received within access opening 360 when cover 362 is closing access opening 360. Lower wall 448 assists in registering cover 362 in place over access opening 360 and assists in the sealing of access opening 360 by cover 362. In the example illustrated, lower wall 448 supports gasket 442 which further assists in sealing access opening 360 when cover 360 is in place.

Slots 450 project inwardly from end 456 of cover 362 and are sized and located for slidably receiving the shaft portions 432 of knobs 428. Slots 450 are narrower than the width or diameter of the head portions 434 of knobs 428. Passages 452 extend above slots 450 and are wider than slots 450. Passages 452 are sized and located two slidably receive the head portions 434 of knobs such that the knobs assists in retaining cover 362 at end 456.

Tabs 454 comprise projections that extend towards end 458 of cover 362. Tabs 454 underlie an overhanging portion of upper wall 445 and are spaced from upper wall 445 by passage 460. Tabs 454 extend between openings 462. As will be described hereafter, portions of latch 364 move within passage 460 between a latched position which portions of latch 364 extend over tabs 454 to inhibit lifting of cover 362 away from tube 406 and an unlatched position in which the portions of the latch 364 extend over openings 462 to permit end 458 of cover 362 to be pivoted upward and subsequently moved to withdraw knobs 428 from their respective slots 450 and passages 452, allowing cover 362 to be moved to expose access opening 360.

Gasket 442 comprises an elastomeric or compressible ring of material extending about an outer surface of lower wall 438. Gasket 442 is sized to be tightly fit within access opening 360, between the interior edges of access opening 360 and lower wall 448, forming a seal between the interior edges of access opening 360 and lower wall 448. In some implementations, gasket 442 may be omitted.

Inserts 444 are secured to an underside of cover 362 and include internally threaded bores which are aligned with openings 446. Inserts 444 threadably receive externally threaded shafts of attachments, which may be mounted to tube 406 above cover 362. For example, inserts 444 may threadably receive externally threaded bolts extending from a water bottle or beverage bottle cage. In some implementations, openings 446 and inserts 444 may be omitted Latch 364 is movably coupled to tube 406 for movement between a latched state (shown in FIG. 13) releasably securing cover 362 to tube 406 and an unlatched state (shown in FIG. 14), which permits cover 362 to be lifted and moved to a position at which access opening 360 is at least partially uncovered. As shown by FIG. 9, latch 364 comprises outer portion 466, guide portion 468 and cover engaging tabs 470-1, 470-2 (collectively referred to as tabs 470).

Outer portion 466 comprises that portion of latch 364 which is exposed and extends between end 458 of cover 362 and surface 355 of tube 406. As shown by FIG. 8, outer portion 466 has an outer exterior surface 365, which is flush with both the adjacent exterior surface portions 363 of cover 362 and the outer exterior surface portion 355 of tube 406. Outer portion 466 provides a surface by which a person may move latch 364.

Guide portion 468 extends from outer portion 466 and is configured to underlie an overhanging portion of upper wall 445. Guide portion 468 comprises slots 472-1, 472-2. Slots 472-1, 472-2 slidably receive shaft portions 432 of knobs 430-1 and 430-2, respectively. Slots 472-1, 472 have a width narrower than the width of head portions 434 of knobs 430-1, 430-2. As a result, knobs 430-1, 430-2 secure latch 364 to tube 406 while permitting latch 364 to move relative to tube 406 in a direction transverse or perpendicular to the longitudinal axis 473 of tube 406 between an unlatched position (shown in FIG. 12 without cover 362) and a latched position (shown in FIGS. 13 and 14 without cover 362).

Tabs 470 project from guide portion 468 towards end 458 of cover 362. Tabs 470 extend between openings 474 and are configured to slide within passage 460 (shown FIG. 11) above latch engaging tabs 454 and openings 462. Tabs 470 interact with tab 454 and openings 462 to latch and unlatch cover 362.

Figures 15, 16:
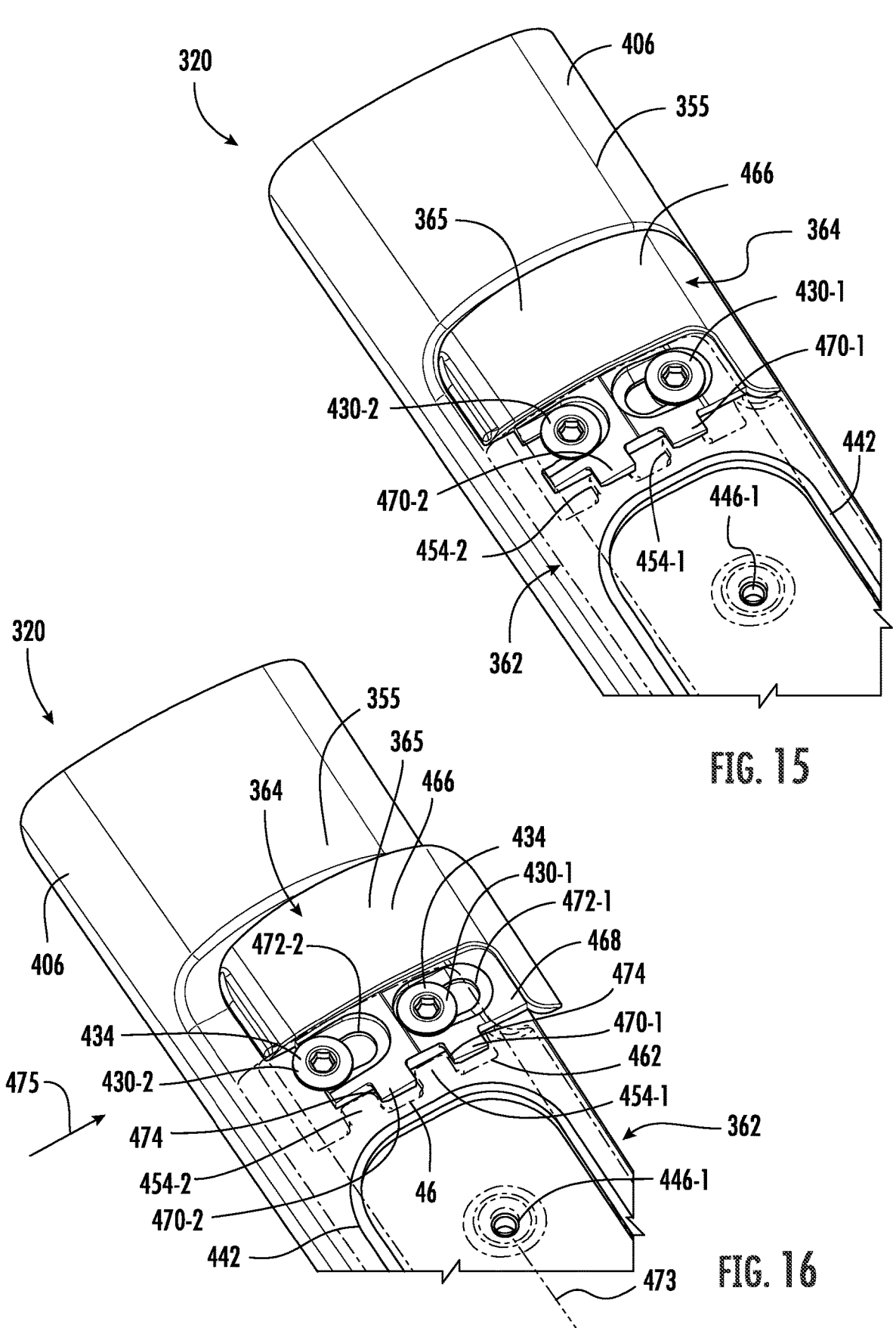
FIG. 15 is a fragmentary top perspective view of the portions of the bicycle of FIG. 8 transparently illustrating the cover with the latch in a latched state.
FIG. 16 is a fragmentary top perspective view of the portions of the bicycle of FIG. 8 transparently illustrating the cover with the latch in an unlatched state.

FIGS. 15-18 illustrate the movement of latch 364 to unlatch cover 362 and further illustrate the removal of cover 362 to provide access to the interior of tube 406 through access opening 360. FIGS. 15 and 16 transparently illustrate cover 362 for purposes of illustration. FIG. 15 illustrates latch 364 is in the latched position or state, cover engaging tabs 470-1 and 470-2 overlie latch engaging tabs 454-1 and 454-2, respectively, of cover 362. At the same time, head portions 434 of knobs 428-1 and 428-2 are captured within passages 452-1 and 452-2 above slots 450-1 and 450-2, respectively, and 456 of cover 362 (each of which is shown in FIGS. 9-11). As a result, cover 362 is locked in place, covering access opening 360, and cannot be lifted or separated from tube 406.

FIG. 16 illustrates latch 364 after latch 364 has been moved to the unlatched position or state. FIG. 16 illustrates latch 364 after latch 364 has been moved relative to tube 406 in the direction indicated by arrow 475, transverse or perpendicular to the longitudinal axis 473 of tube 406. In the unlatched position or state, cover engaging tabs 470-1 and 470-2 directly overlie and are aligned with corresponding openings 462, whereas latch engaging tabs 454-1, 454-2 of cover 362 directly underlie openings 474.

Figures 17, 18:
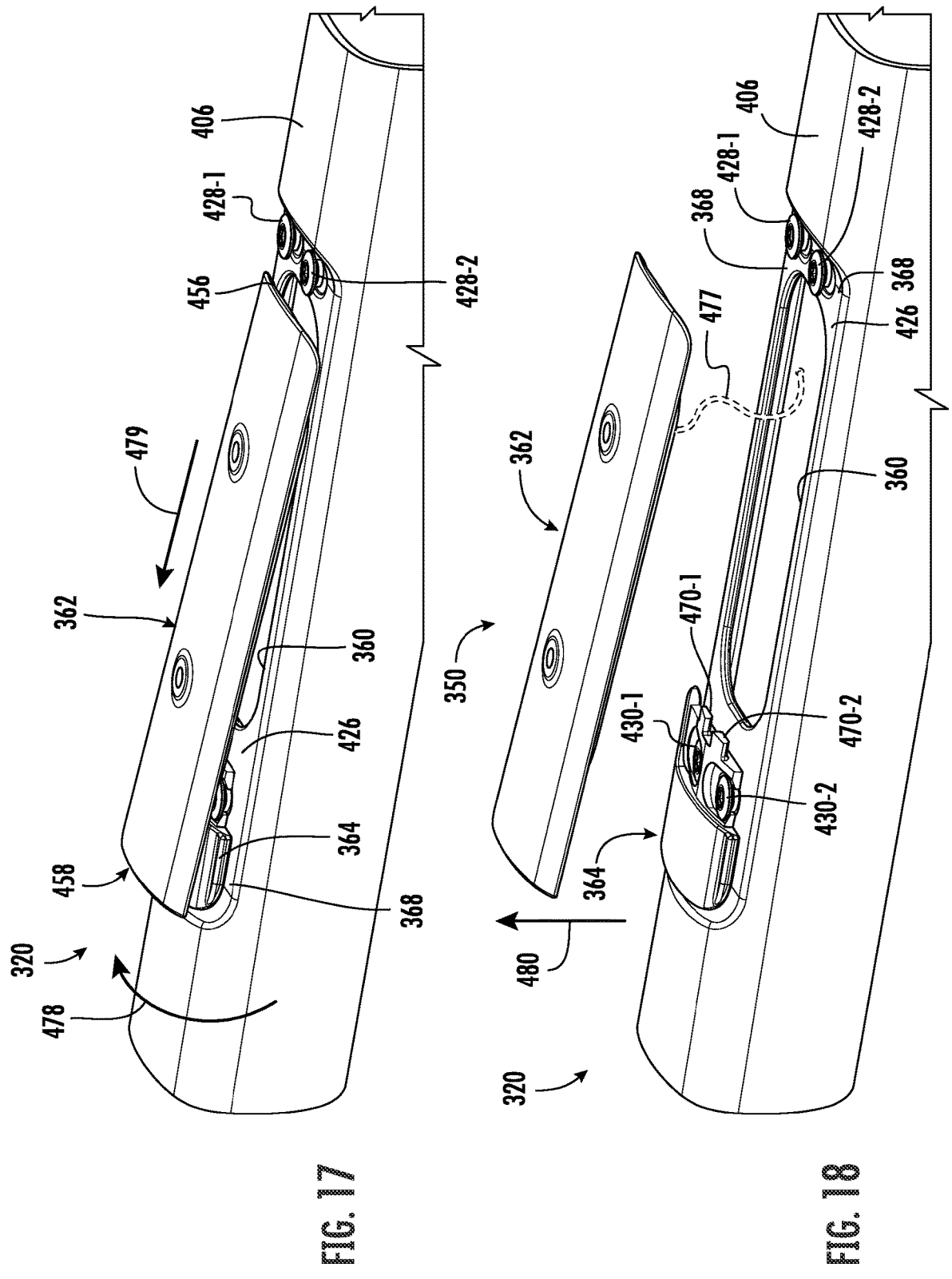
FIG. 17 is a fragmentary perspective view of the portions of the bicycle of FIG. 8 illustrating pivoting and translation of the cover while the latch is in the unlatched state.
FIG. 18 is a fragmentary perspective view of the portions of the bicycle of FIG. 8 illustrating disconnection of the cover from the latch and further withdrawal of the cover from the tube.

FIG. 17 illustrates the initial pivoting of end 458 of cover 362 away from tube 406 as indicated by arrow 478. During such pivoting, latch engaging tabs 454-1 and 454-2 are up lifted through openings 474. During such pivoting, head portions 434 of knobs 428-1 and 428-2 may also slightly pivot within passages 452-1 and 452-2, respectively. Once end 458 of cover 362 has been sufficiently pivoted, cover 362 may be translated or slid in the direction indicated by arrow 479. During such sliding movement, knobs 428-1 and 428-2 slide within slots 450-1, 450-2 and passages 452-1 and 452-2, respectively, until they are withdrawn from slots 450-1, 450-2 and passages 452-1 and 452-2, respectively, as shown by FIG. 17.

FIG. 18 illustrates cover 362 being lifted away from tube 406 in the direction indicated by arrow 480. Such lifting results in cover 362 exposing access opening 360 provide access to the interior of tube 406. In the example illustrated, such lifting results in cover 362 being completely separated and detached from both tube 406 and latch 364. In other implementations, cover 362 may alternatively dangle or hang from tube 406 while access opening 360 is uncovered.

For example, in some implementations, tube storage 351 may additionally comprise a flexible tether 477, such as a flexible cable, strap, cord or the like (shown in broken lines) having a first end secured to and extending from cover 362 and a second end secured to tube 406. Tether 477 has a length sufficient such that cover 362 may be moved to a position so as to completely expose access opening 360. In some implementations, the first end of tether 477 may be in integrally formed as part of a single unitary body with portions of cover 362 or may be fixedly attached to cover 362. Likewise, the second end of tether 477 may be integrally formed as part of a single unitary body with portions of tube 406 or may be fixedly attached to tube 406. In the example illustrated, tether 477 extends from an underside of cover 362 and is connected to tube 406 at a location within the interior of tube 406 or within recessed portion 368 of tube 406 such that tether 477 may be talked inside of tube 406 when cover 362 is closing access opening 360. In other implementations, tether 477 may be secured to exterior portions of cover 362 and tube 406.

Bicycle 520 with Alternative Tube Storage

Figures 19, 20A:
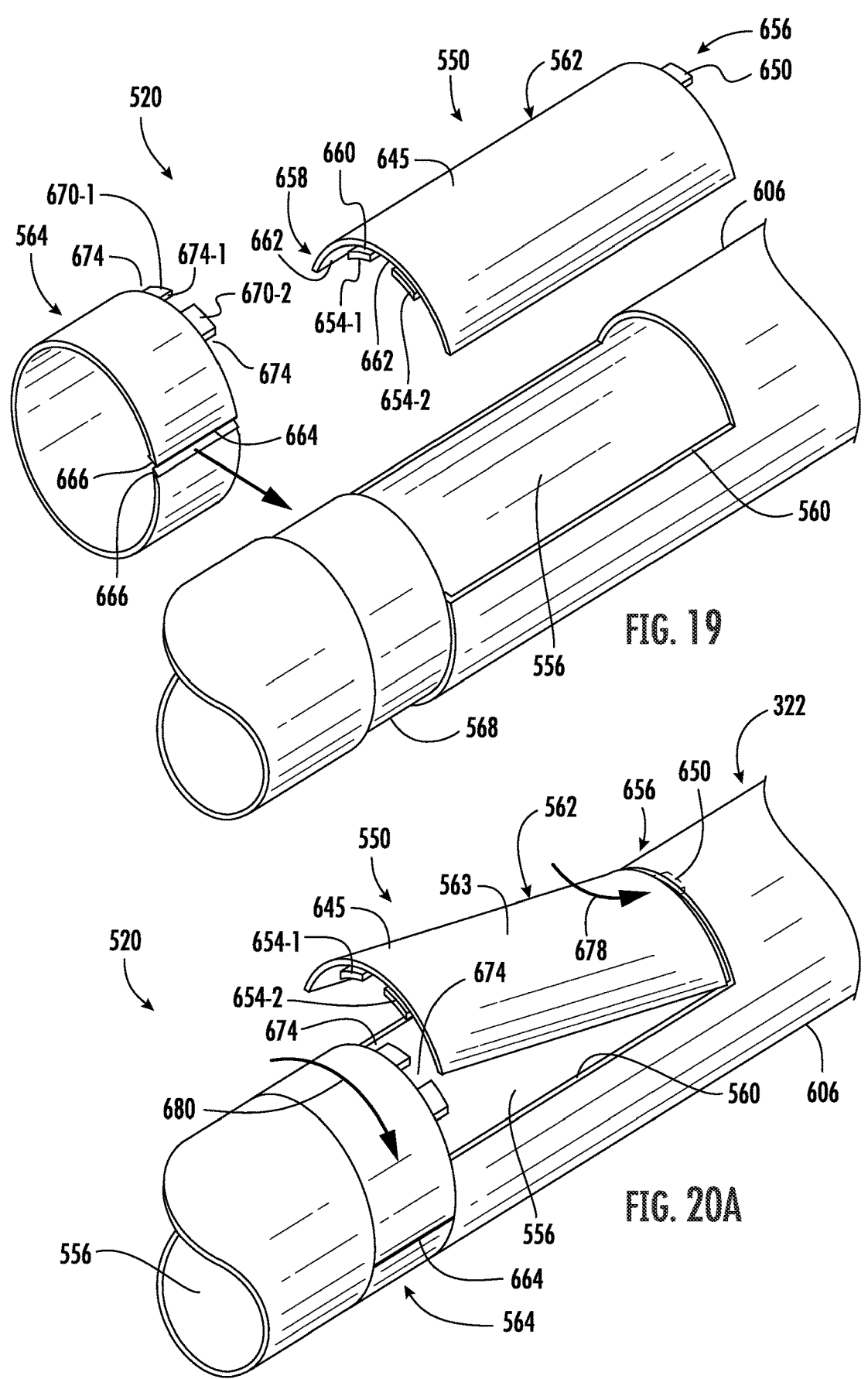
FIG. 19 is an exploded fragmentary perspective view of portions of an example bicycle having an example tube storage.
FIG. 20A is a fragmentary perspective view illustrating the portions of the bicycle of FIG. 19 with a latch in an unlatched state and mounting of a cover to a tube of the bicycle.
Figure 20B:
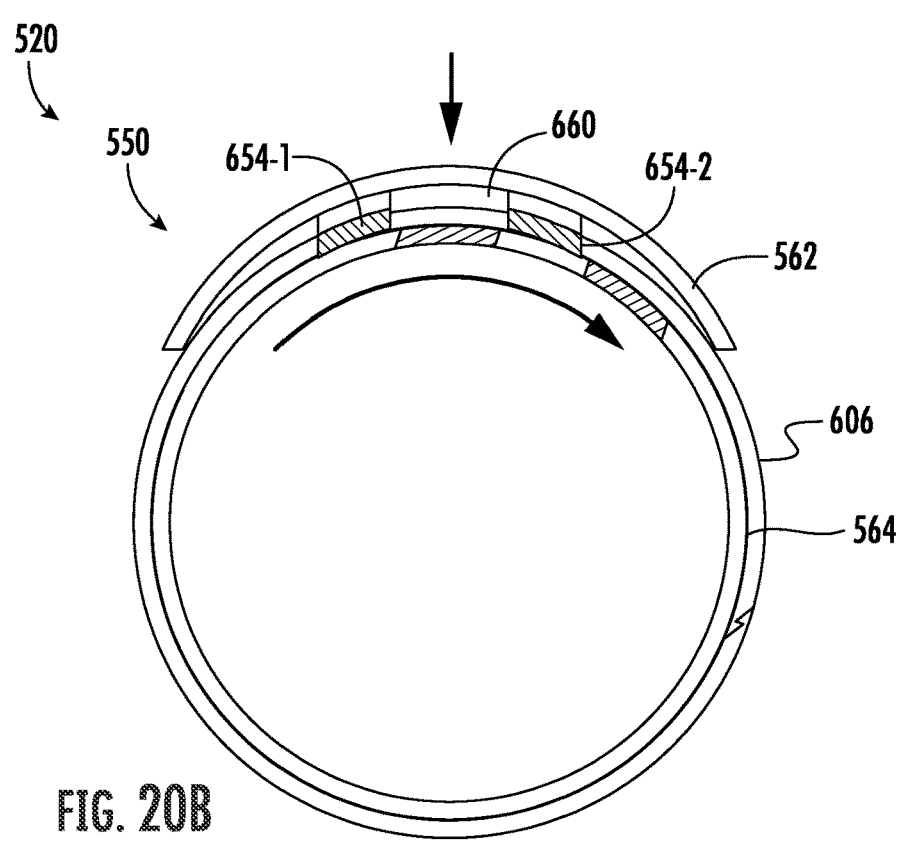
FIG. 20B is a cross-sectional view of the portions of the bicycle of FIG. 20A.

FIGS. 19-26 illustrate portions of an example bicycle 520. FIGS. 19-26 illustrate an example of how a cylindrical tube of a bicycle may be provided with a storage system having a latch that remains coupled to the tube when in an unlatched state and while being disconnected from a cover of the storage system. Bicycle 520 is similar to bicycle 320 described above except that bicycle 520 comprises tube 606 and storage system 550 in place of tube 406 and storage system 150, respectively. As shown by FIG. 19, storage system 550 comprises access opening 560, cover 562 and latch 564. The remaining components of bicycle 520 which correspond to components of bicycle 320 are numbered similarly and/or are shown in FIGS. 5-6.

Tube 606 is provided as part of frame 322 of bicycle 520. In one example implementation, tube 606 comprises a downtube of bicycle 520. In other implementations, tube 606 may form other parts of bicycle frame 322. Tube 606 comprise a hollow cylinder having and interior 556 and a smaller diameter outer recessed portion 568. Interior 556 provides a volume for storing articles within tube 606.

Recessed portion 568 comprise that portion of tube 606 having an outer surface having a reduced outer diameter. In some implementations, tube 606 may have a constant wall thickness, wherein portions of the wall of tube 606 are bent or deformed inwardly to form recessed portion 568. In some implementations, the inner diameter of tube 606 may be constant, wherein the outer diameter of tube 606 is reduced in those regions of recessed portion 568. As will be described hereafter, recessed portion 568 receives latch 564, facilitating a flush relationship between outer adjacent exterior surfaces of tube 606, cover 562 and latch 564 to maintain a sleek and aerodynamic construction. Recessed portion 568 further provides an outer circumferential surface about which latch 564 may rotate between latched and unlatched states.

Cover 562 comprises a cover wall 565 sized and configured to cover access opening 560 when positioned on and supported by tube 606. In the example illustrated, cover 562 is an outer circumferential surface 563 which is configured to be flush with the adjacent exterior surface portions of tube 606 and latch 564 when cover 562 is closing access opening 560.

Cover 562 further comprises tube engaging tab 650 and latch engaging tabs 654-1, 654-2 (collectively referred to as tabs 654). Tube engaging tab 650 projects from upper wall 645 at end 656 of cover 562. Tube engaging tab 650 is size and located so as to project within the interior 556 of tube 606, adjacent to and below an interior diameter of tube 606 so as to inhibit vertical lifting of cover 562 from tube 606 and away from access opening 560.

Latch engaging tabs 654 project from upper wall 645 below upper wall 645 at end 658 of cover 562. Latch engaging tabs 654 extent alongside openings 662. Latch engaging tabs 654 extend below a passage 660 which extends above in between such tab 654 and the lower surface of upper wall 645. Latch engaging tabs 654 are sized and configured to engage portions of latch 564 when latch 564 is in the latched state to retain cover 562 in a closed position over access opening 560.

Latch 654 comprises a cylindrical sleeve which wraps about, and which rotates about the cylindrical outer surface of recessed portion 568 of tube 606. In the example illustrated, latch 654 is severed along line 664 and is sufficiently flexible such that latch 654 may be opened, spread apart at line 664 when being wrapped about recessed portion 568. Once positioned about recessed portion 568, adjacent edge portions along line 664 may be secured or attached to one another to inhibit inadvertent withdrawal from tube 606. In the example illustrated, each of the opposing edge portions of latch 564 along line 664 comprise a hooked portion 666, permitting the opposite edges along line 6 just for to be snapped and retained together about recessed portion 568. In other implementations, edge portions of latch 564 adjacent line 664 may be secured to one another in other fashions. In some implementations, latch 564 may comprise a continuous sleeve which is positioned about recessed portion 568 in other fashions.

Latch 564 further comprises cover engaging tabs 670-1 and 670-2 (collectively referred to as tabs 670). Tabs 670 project from latch 564 towards cover 562 and extent alongside openings 674. Although cover 552 and latch 564 are each illustrated as comprising a pair of such tabs, in other implementations, one or both of cover 562 and latch 564 may include other numbers of interacting tabs and associated openings.

FIGS. 20-23 illustrate the positioning of cover 562 over access opening 560 to close access opening 560. As shown by FIGS. 20A and 20B, end 656 of cover 562 is tilted and then translated as indicated by arrow 678 so as to locate tube engaging tab 650 beneath portions of tube 606 bordering access opening 560. As indicated by arrow 680, latch 564 is rotated about recessed portion 568 to locate openings 674 below latch engaging tab 654.

Figure 21B:
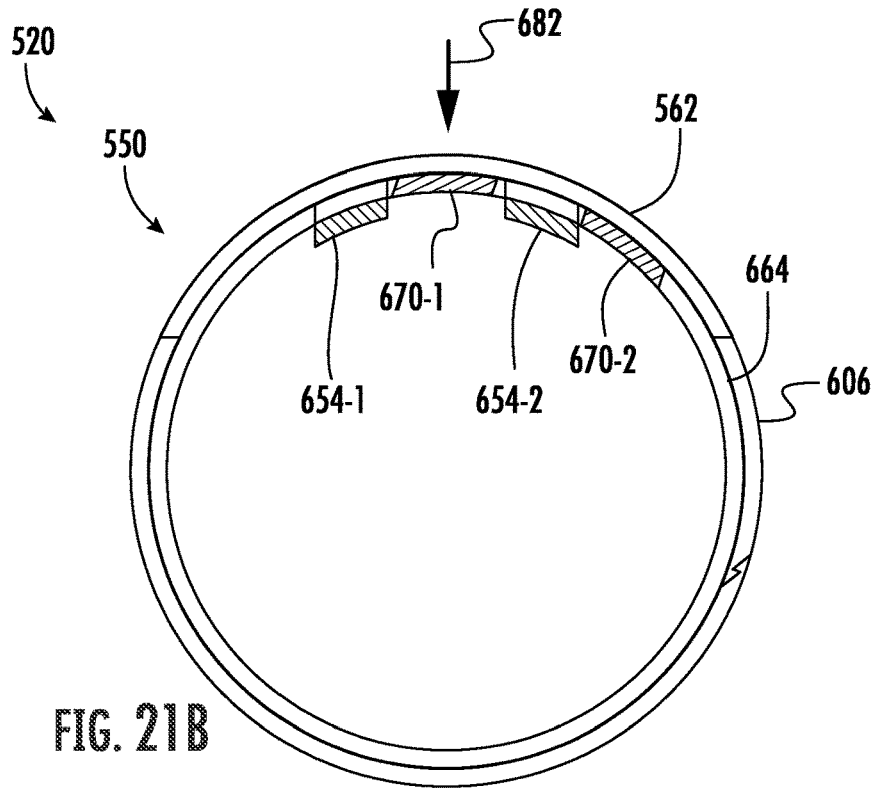
FIG. 21B as a cross-sectional view of the portions of the bicycle of FIG. 21A.
Figures 21A, 22A:
FIG. 21A is a fragmentary perspective view of the portions of the bicycle of FIG. 19 with the cover closing an access opening of the tube storage.
FIG. 22A is a fragmentary perspective view of the portions of the bicycle FIG. 19 illustrating movement of the latch to a latched state.

FIGS. 21A and 21B illustrate the lowering of cover 562 towards tube 606 in the direction indicated by arrow 682. During such lowering, latch engaging tabs 654 are lowered through openings 674 to positions below cover engaging tabs 670, which are circumferentially offset from latch engaging tabs 654. In the state shown FIG. 21, cover engaging tabs 670 are located within the circumferential passage 660.

Figures 22B, 23:
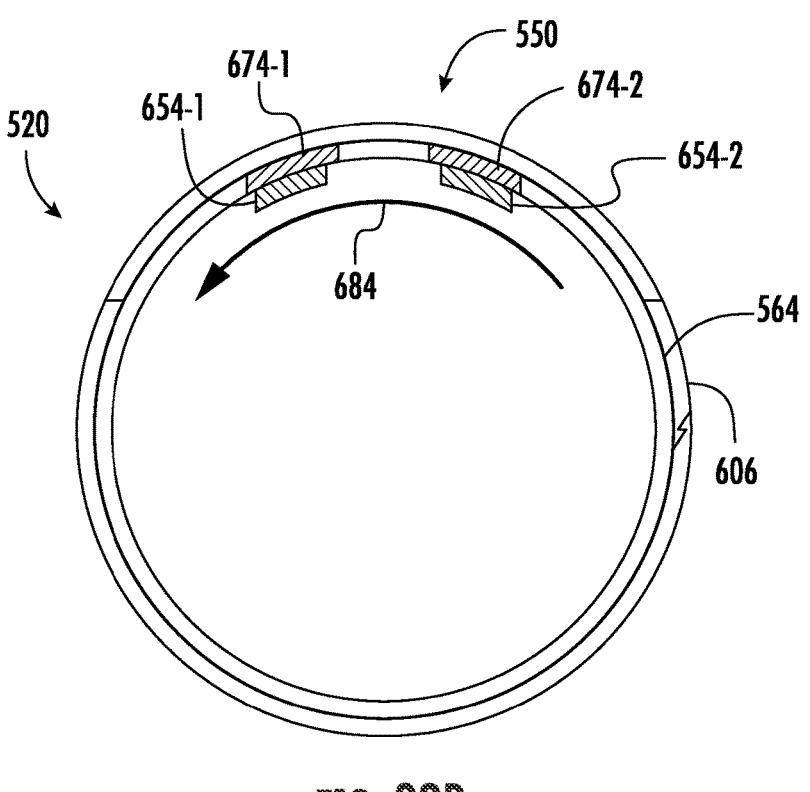
FIG. 22B is a cross-sectional view of the portions of the bicycle of FIG. 22A.
FIG. 23 is a sectional view of the portions of the bicycle of FIG. 22A.

FIGS. 22A and 22B illustrates the rotation of latch 564 in the direction indicated by arrow 684 from an unlatched state to a latched state. In the latched state shown in FIG. 22, cover engaging tabs 670-1 and 670-2 extend within passage 660 and directly overlie latch engaging tabs 654-1 and 654-2, respectively. As a result, cover 562 is secured in place over access opening 560.

As further shown by FIGS. 22A and 23, when latch 564 is in the latched state, the outer exterior of latch 564, cover 562 and tube 606 are all flush, presenting a continuous smooth outer circumferential and cylindrical surface without any abrupt shoulders or edges, but for the seams between such components. Tube 606 maintains its sleek and aerodynamic construction despite the provision of storage system 550.

To gain access to the interior 556 of tube 606, the general process described above in FIGS. 20A, 21A and 22A is reversed. In particular, latch 654 is rotated about recessed portion 568 in a direction opposite to arrow 684 shown in FIG. 22A so as to once again position cover engaging tabs 670 over openings 674, in alignment with openings 674 as shown in FIG. 21B. Thereafter, end 658 of cover 562 may be lifted in a direction opposite to that of arrow 680 to pivot end 658 upwardly to the state shown in FIG. 20B. Once in this position, cover 562 may be translated or slid to withdraw tube engaging tab 650 from beneath tube 606, permitting cover 562 to be completely separated and detached from tube 606 as well as latch 564. As described above with respect to storage system 150, cover 562 may, in some implementations, be tethered to tube 606.

Storage System 350

Figure 24:
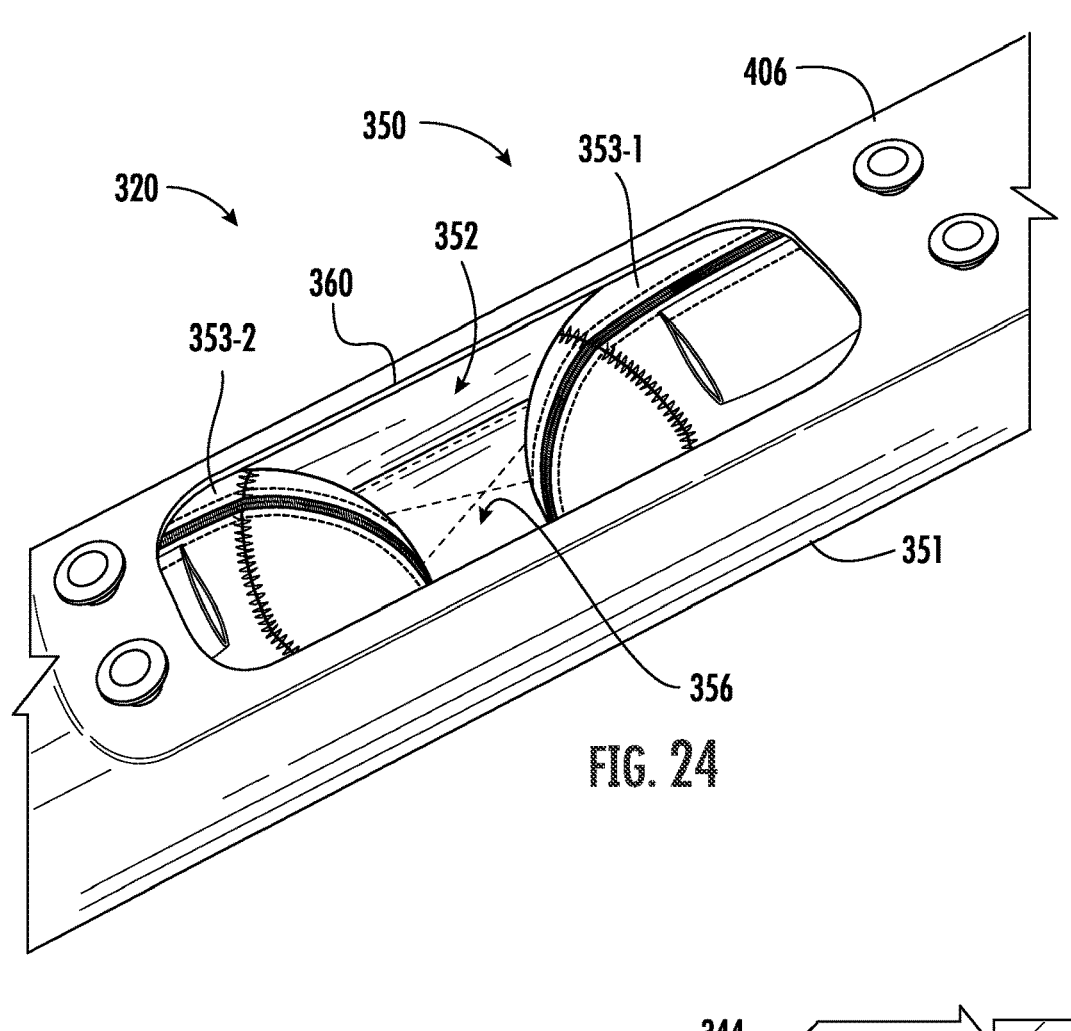
FIG. 24 is a fragmentary perspective view of the portions of the bicycle of FIG. 8 illustrating an example cable retainer and example tube pouches within the example tube which is illustrated without the cover and the latch.

FIG. 24 is an enlarged perspective view illustrating bicycle 320 with storage system 350 including cable retainer 352 and tube pouches 353-1, 353-2 positioned within interior 356 of tube 406. For purposes of illustration, the above-described tube storage 351 is illustrated without cover 362 and latch 364. As shown by FIG. 24, tube pouches 353 may be inserted into tube 406, alongside of cable retainer 352, in an end-to-and relationship with the ends of tube pouches 353 underlying access opening 360. Cable retainer 352 manages any cables routed through tube 406, retaining such cables against the interior sides of tube 406. As a result, such cables minimally interfere with the insertion, withdrawal and positioning of tube pouches 353 in tube 406. In the example illustrated, cable retainer 352 retains the cables of cabling 344 along and just below the rim portion 361 of tube 406 that extends about access opening 360, enhancing efficient use of the available volume within tube 406.

Cable Retainer

Figure 25:
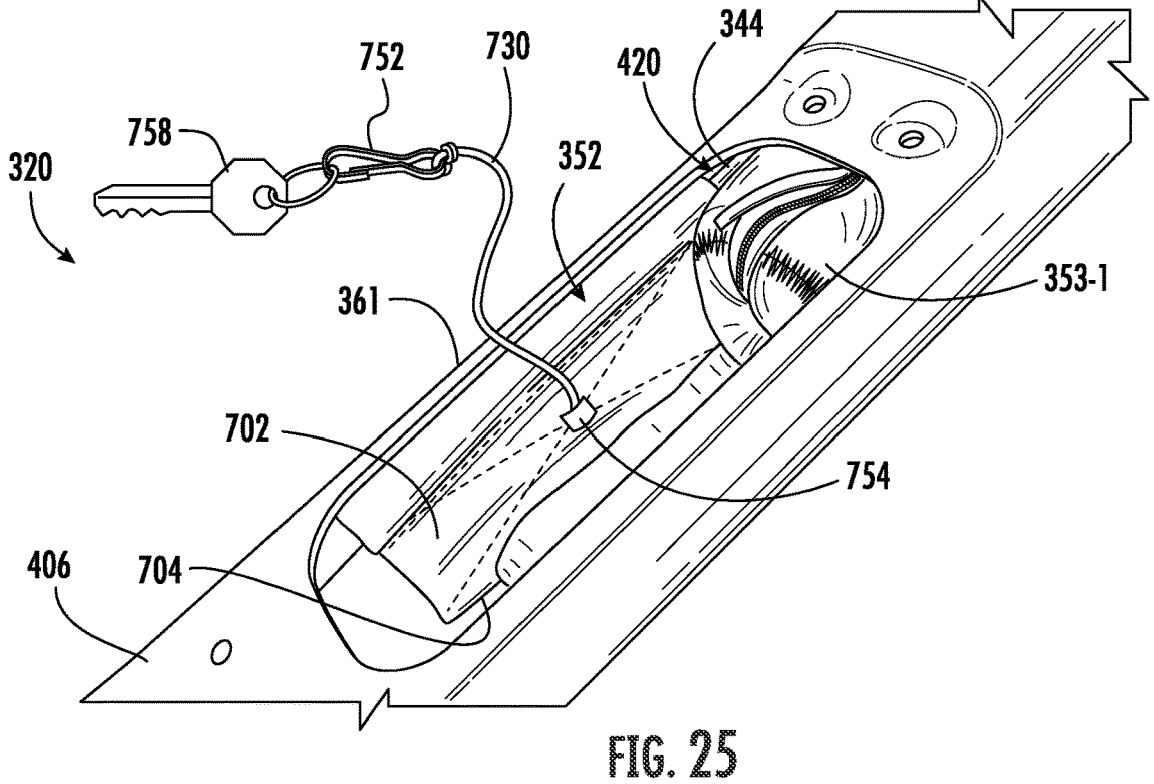
FIG. 25 is a fragmentary perspective view of the portions of the bicycle of FIG. 8 illustrating the example cable retainer and an example tube pouch within the example tube which is illustrated without the cover and the latch.

FIG. 25 illustrates bicycle 320 of FIG. 24 with tube pouch 353-2 being removed to better illustrate cable retainer 352. Cable retainer 352 manages any cables 420 of cabling 344 routed through tube 406, retaining such cables against the interior sides of tube 406. As a result, such cables minimally interfere with the insertion, withdrawal and positioning of tube pouches 353 in tube 406. In the example illustrated, cable retainer 352 retains the cables 420 of cabling 344 along and just below the rim portion 361 of tube 406 about access opening 360, enhancing efficient use of the available volume within tube 406. In addition, because cables 420 are held near the top wall of tube 406, storage pouches 353 may be more easily slid along and against the bottom interior surface of tube 406 with less resistance or obstruction.

Figures 26, 27, 28:
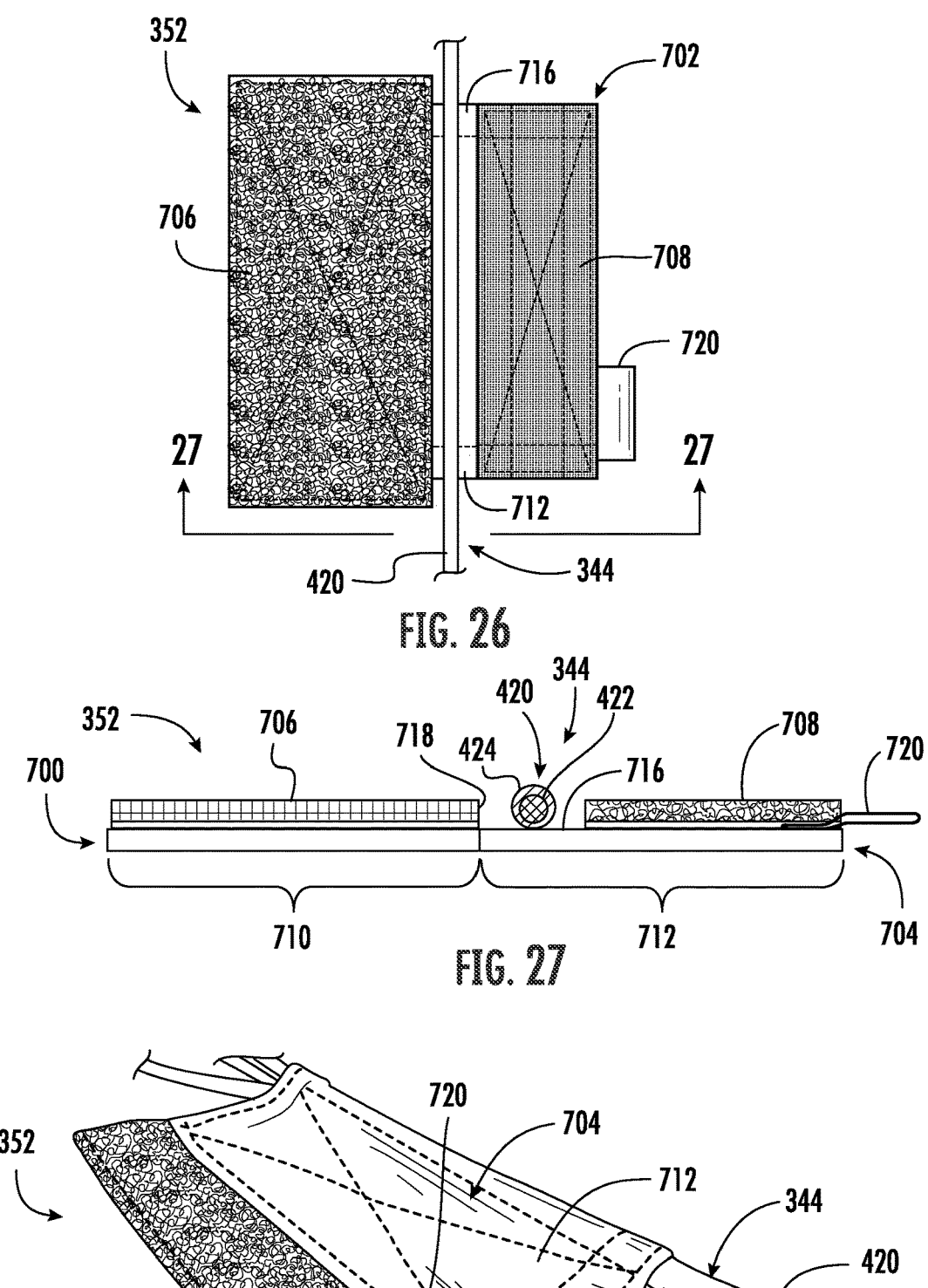
FIG. 26 is a perspective view of the example cable retainer of the bicycle of FIG. 25 with an example flexible panel in an opened state about an example cabling.
FIG. 27 is an end view of the example cable retainer FIG. 26 taken along line 27-27.
FIG. 28 is a perspective view of the example cable retainer of FIG. 26 in a closed state, wrapped about the example cabling.

FIGS. 26-28 illustrate cable retainer 352 removed from the interior 356 of tube 406. Cable retainer 352 comprises a flexible panel 700 configured to wrap about those cables 420 of cabling 344 when in a closed state, as shown by FIG. 28. Cable retainer 352 further comprises connector 702 for releasably securing the flexible panel 700 in the closed state, wrapped about cables 420. Because the flexible panel wraps about the cables 420 and is releasably secured in the closed, cable wrapping state, cable retainer 352 may accommodate a different number of cables 420 or differently sized cables 420 forming cabling 344 and may be used with different bicycles having different numbers or sizes of such cables.

Because the connector 702 releasably retains or secures a flexible panel 700 in the closed, cable wrapping state, flexible panel 700 may be moved and opened to enable repositioning or adjustment of such cables 420.

In the example illustrated, flexible panel 700 is formed from a single integral backing panel 704 and a connector 702 in the form of a hook and loop fastener comprising a loop pad 706 and a hook pad 708. Backing panel 704 continuously extends between underlies both of pads 706 and 708. As shown by FIG. 27, backing panel 704 comprises a first portion 710 and a second portion 712. First portion 710 is wider than second portion 712 and supports loop pad 706. Second portion 712 supports hook pad 708 and includes an uncovered or exposed portion 716 extending between hook pad 708 and loop pad 706. As portion 716 is thinner and does not support loop pad 706 or hook pad 708, portion 716 may be more flexible and bendable, forming a living hinge over portion 710. The thinner construction of portion 716 further forms a cable wrapping portion 718, in the form of a channel, for receiving and wrapping about cable 420 (an additional cables 420) of cabling 344. Such cables may be stacked on top of one another and/or pushed down into the hook and loop patches or pads. The hook pad 708 and the loop pad 706 are spaced by a distance of at least 0.5 inch to form an uncovered portion of the backing panel 704, which forms a cable wrapping portion 716 of the flexible panel 700.

To facilitate manual gripping of portion 712 and the folding or unfolding of portion 712 over and about any of cables 420, cable retainer 352 additionally comprises pull tab 720. Pull tab 720 projects from portion 712 of flexible panel 700. In the example illustrated, pull tab 720 is stitched, glued or otherwise secured to backing panel 704 between backing panel 704 and hook pad 708. In other implementations, pull tab 720 may be secured to an underside of backing panel 704, may be stitched to an edge of backing panel 704, or may be omitted.

In one example implementation, backing panel 704 is formed from a durable, no stretch, lightweight material such as ripstop nylon. Pull tab 720 is formed from a nylon webbing. Pads 706 and 708 are each stitched or sewn to backing panel 704. In other implementations, backing panel 704 and pulled tab 720 may be formed from other materials and may be joined to one another in other fashions such as by adhesives, welding, or the like. In some implementations, rather than comprising a single integral backing panel 704, flexible panel 700 may comprise multiple distinct panels which are sewn, bonded or otherwise joined together.

In some implementations, flexible panel 700 may comprise other forms of connectors in lieu of a hook and loop fastener to releasably secure portion 712 in a closed or wrapped state about cabling 344 and over portion 710. In some implementations, in lieu of a single large loop pad 706 and a single large hook pad 708, connector 702 may be formed from multiple spaced smaller hook and loop pads that overlap and interconnect to one another when portion 712 is wrapped about cabling 344 and is secured to portion 710. In some implementations, portion 712 may be releasably secured in an overlapping fashion to portion 710 by snaps, quick release buckles, a zipper or other connection mechanisms.

FIG. 28 illustrates flexible panel 700 in a closed state, wrapped about a pair of cables 420 which are part of cabling 344. Because loop pad 706 (and its underlying portion 710 of backing panel 704) is wider and longer than hook pad 708 (and its underlying portion 712 of backing panel 704), hook pad 708 may be more securely connected to loop pad 706 even when secured at an off angle. As a result, the chance that the hook and loop pads of two portions 712 and 710 may become disconnected during the removal of tube pouches 353 or the insertion of tube pouches 353 is reduced. In other implementations, hook pad 708 and loop pad 706 may have similar dimensions. In some implementations, portion 710 may alternatively support a hook pad while portion 712 supports a loop pad.

Figures 29, 30:
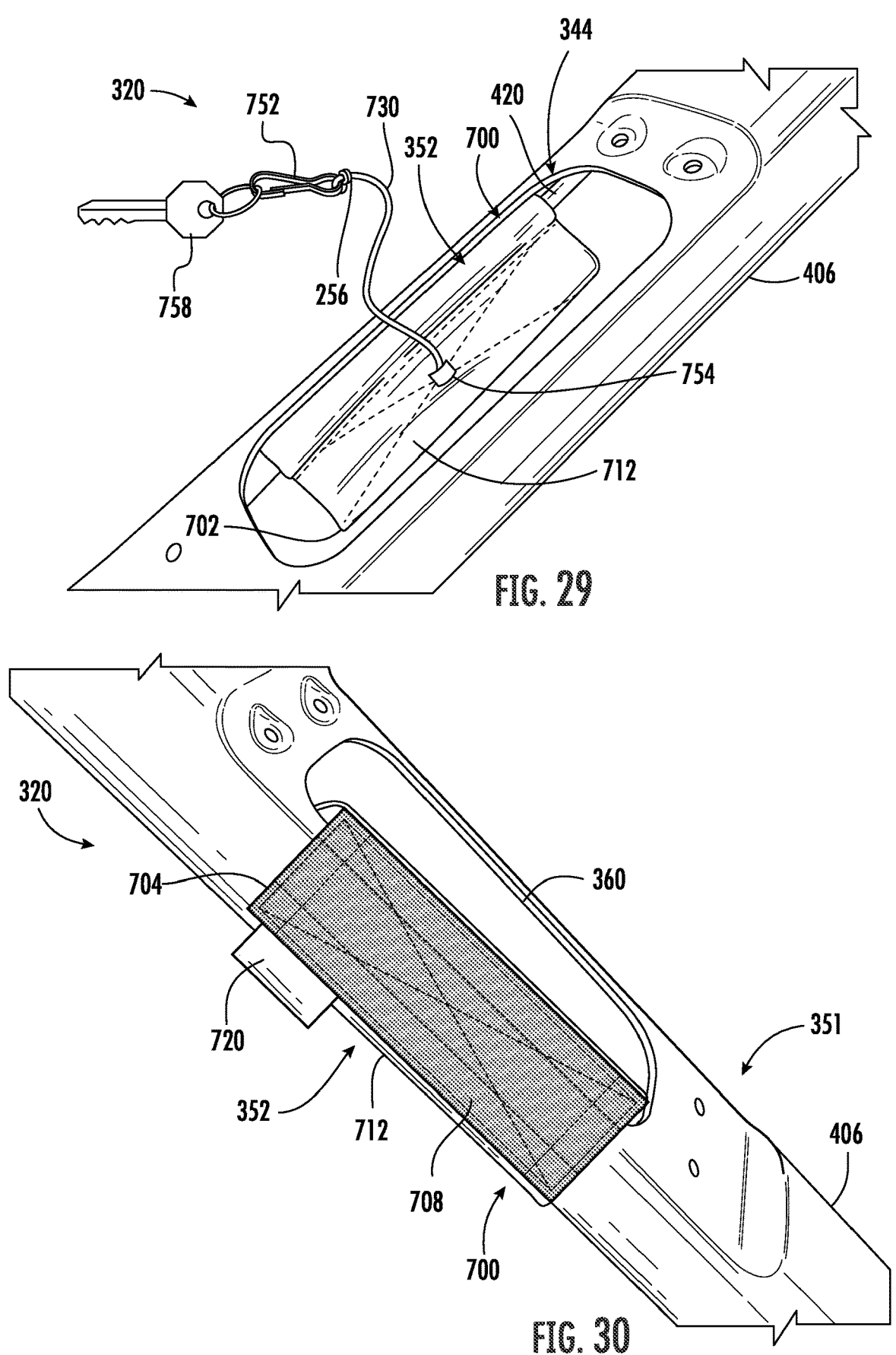
FIG. 29 is a fragmentary perspective view of the portions of the bicycle of FIG. 8 illustrating the cable retainer within the example tube without any tube pouches, the cover or the latch.
FIG. 30 is a fragmentary perspective view of the portions of the bicycle of FIG. 29 illustrating a portion of the cable retainer positioned outside the example tube.

FIGS. 29 and 30 illustrated cable retainer 352 deployed in tube 406. FIG. 29 illustrates cable retainer 352 with flexible panel 700 folded about cables 420 of cabling 344 and retained in a closed state by connector 702. For purposes of illustration, tube storage 351 is illustrated without cover 362 or latch 364. As shown by FIG. 29, first portion 710 of backing panel 704 and of flexible panel 700 is retained adjacent to and close conformity to the interior surface of tube 406 on one side of access opening 360. In the example illustrated, first portion 712 is adhesively bonded to the interior of tube 406. In other implementations, first portion 710 may be retained against and in conformal contact with the interior surface of tube 406 by other means such as snaps or the like. In some implementations, first portion 710 is retained against and in conformal contact with the interior surface of tube 406 by a spring, such as a flat spring having opposite ends with attained in first portion 710 and intermediate portions resuming bent to a curved shape along the interior surface of tube 406.

As further shown by FIG. 29, in some implementations, cable retainer 352 may additionally comprise a tether 730 and a clip 752. Tether 730 has a first and 754 secured to a back face of second portion 712 of flexible panel 700 and a second end 756 secured to clip 752. Clip 752 comprise a mechanism to releasably attach to a tool or other item 758 such as a key or multiple keys. Such items may be released from clip 752. When being stored, such items 758, along with tether 730 may be located within tube 406 below cover 362. In some implementations, tether 730 clip 752 may be omitted.

As shown by FIG. 30, second portion 712 forms a top flap, which when opened, extends outside of tube 406. Second portion 712 is able to flop over the side of tube 406 and may remain there without being fixed or held in place by a rider or mechanic. As a result, the rider or mechanic may adjust cable placement as desired before once again pivoting the flap formed by second portion 712 about the adjusted cables and back to the closed position shown in FIG. 29.

Tube Pouch

Figures 31, 32, 38, 40:
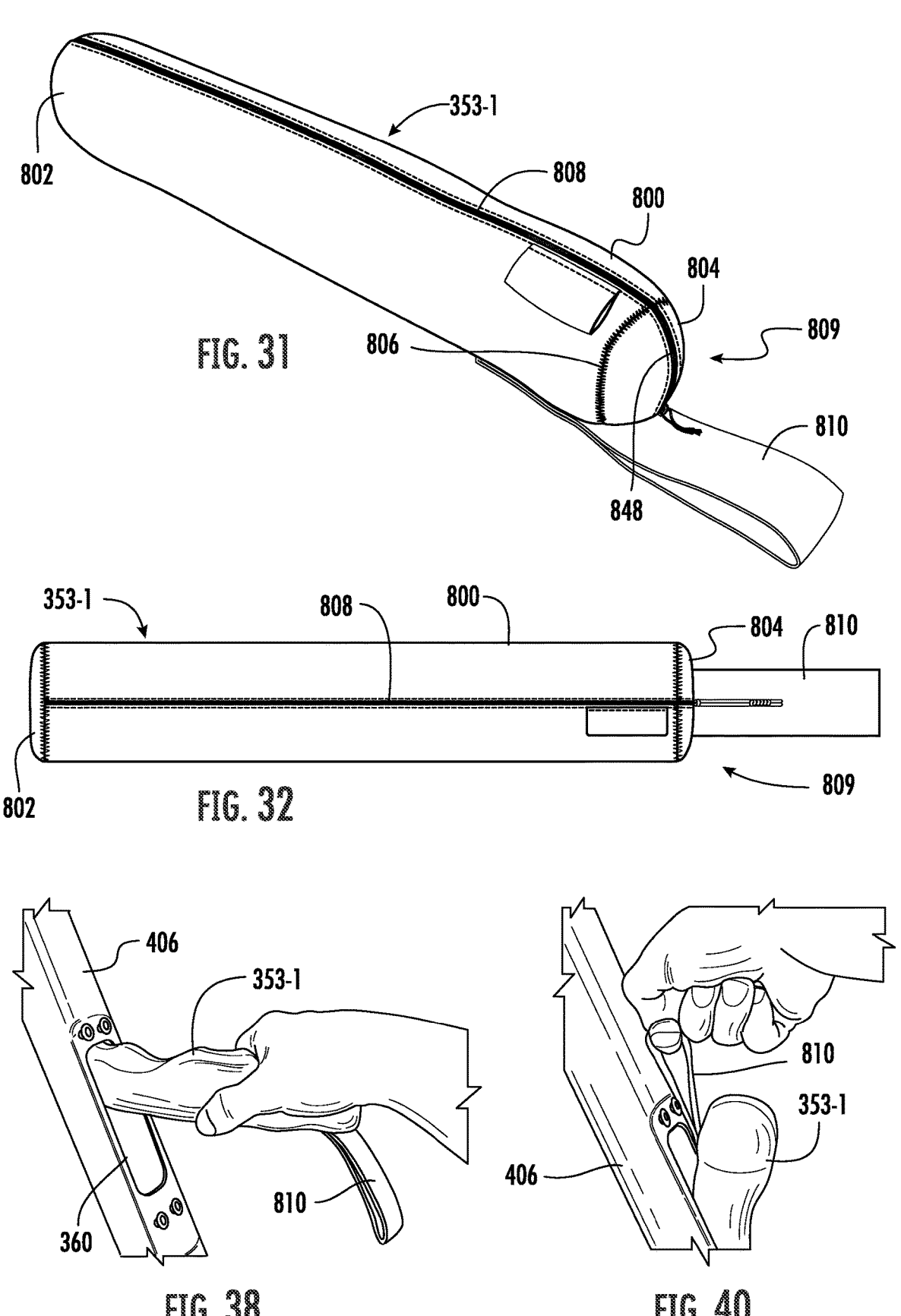
FIG. 31 is a perspective view of one of the example tube pouches of the bicycle of FIG. 24.
FIG. 32 is a top view of the example tube pouch of FIG. 31.
FIG. 38 is a perspective view of the portions of the bicycle of FIG. 8 illustrating insertion of the example tube pouch into the example tube.
FIG. 40 is a perspective view of the portions of the bicycle if You can relate illustrating withdrawal of the example tube pouch from the example tube.

FIGS. 31-32 illustrate tube pouch 353-1, which is identical to pouch 353-2. Tube pouch 353-1 comprises an elongate storage pouch sized and configured to be inserted through access opening 360 and pushed into the interior of tube 406 as shown in FIG. 24 and to be pulled from tube 406 through access opening 360. Tube pouch 353-1 comprises a cylindrical outer wall 800 and axial end caps 802 and 804. In the example illustrated, end caps 802 and 804 are butted and cross stitched by cross stitches 806 to the edges of cylindrical wall 800 to reduce overlapping fabrics and conserve space.

Figures 33, 34:
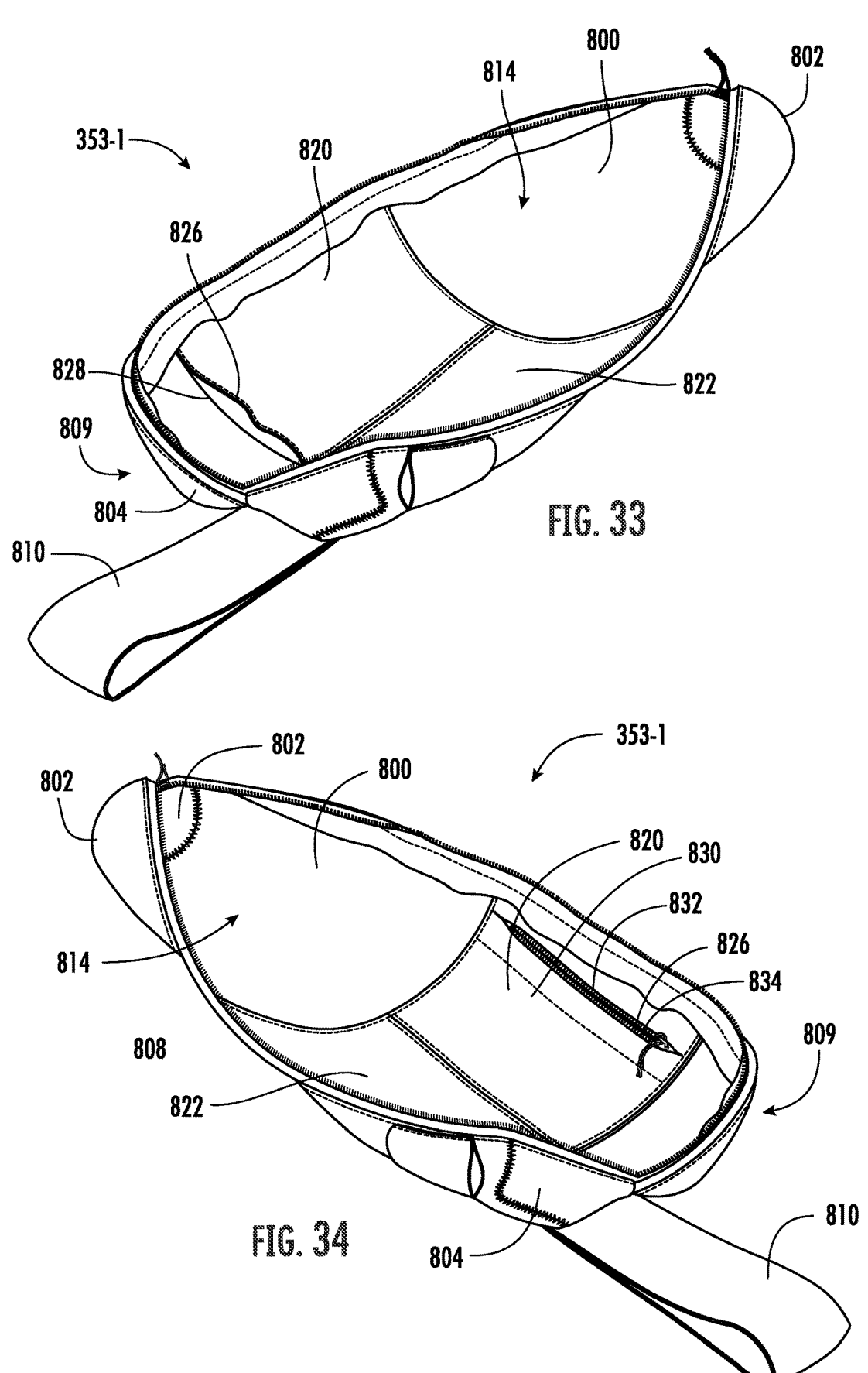
FIG. 33 is a top perspective view of the example tube pouch of FIG. 31 in an opened state.
FIG. 34 is a top perspective view of the example tube pouch of FIG. 31 in the opened state.

Tube pouch 353-1 has an interior for storing items, wherein the interior may be accessed through the actuation of zipper 808 which extends along a top of the adjoining edges of outer wall 800. In the example illustrated, endcap 804 further comprises a middle slit 848 along which zipper 808 further extends, facilitating the opening of tube pouch 353-1 to a near flat state at end 809 as shown in FIGS. 33 and 34. In the example illustrated, the teeth of zipper 808 are substantially, if not completely, covered by the material of outer wall 800. In the example illustrated, zipper 808 comprises a toothed nylon coil zipper. In other implementations, the adjacent edges of outer wall 800 forming the main mouth of tube pouch 353-1 may be selectively closed by other closing mechanisms such as hook and loop fasteners, snaps, buttons, non-toothed plastic zippers (ZIPLOC) and the like.

As further shown by FIGS. 31 and 32, tube pouch 353-1 further comprises a pull tab 810 stitched or otherwise secured to a bottom side of outer wall 800 at front end 809. Pull tab 810 is to be positioned below access opening 360 when to pouch 353-1 is inserted into tube 406 as shown in FIG. 24. Pull tab 810 may be grasped by a person to pull to pouch 353-1 and withdraw pouch 353-1 from tube 406 through access opening 360.

FIGS. 33 and 34 illustrate tube pouch 353-1 in an open state and depict the interior 814 of pouch 353-1. In the example illustrated, pouch 353-1 comprises additional interior panels 820 and 822 secured to inside surfaces of outer wall 800 stitching, adhesives, welds or the like. As shown by FIG. 33, panel 820 is joined to outer wall 800 at end 809 along three sides to form an interior pocket 826 with the open side or edge forming a mouth 828 for the pocket 826. Mouth 828 faces end 809, facilitating insertion of articles into pocket 826 from the opened end 809 and in axial a direction parallel to the longitudinal axis of tube pouch 353-1. In the example illustrated, panel 820 is formed from a resiliently stretchable material such as a polyester spandex blend such that panel 820 may be stretched to accommodate large articles and may grip and retain such articles within pocket 826.

As shown by FIG. 34, panel 822 is joined to outer wall 800 opposite to panel 822 adjacent end 809. Panel 822 is joined to outer wall 800 along three sides to form an interior pocket 830 with the open side or edge forming a mouth 832. Mouth 832 faces in a direction perpendicular to the mouth 828, parallel to the longitudinal axis of tube pouch 353-1. In the example illustrated, mouth 832 is selectively closed by an internal zipper 834. In other implementations, mouth 832 may be left open or may be selectively closed by other closing mechanisms such as hook and loop fasteners, snaps, buttons, plastic non-toothed zippers (ZIP LOC) and the like. Because pocket 826 and pocket 832 are both positioned proximate to the front end 809 and the split axial endcap 804 where pouch 353-1 may be opened, access to such pockets and their content is enhanced. In some implementations, one or both of pocket 826 and 832 may be omitted or may be provided at other interior locations. In some implementations, additional pocket along the interior of pouch 353-1 may be provided. In some implementations, a ring may be tethered along the interior 814, the ring adapted to be connected to keys or other items.

Figure 35:
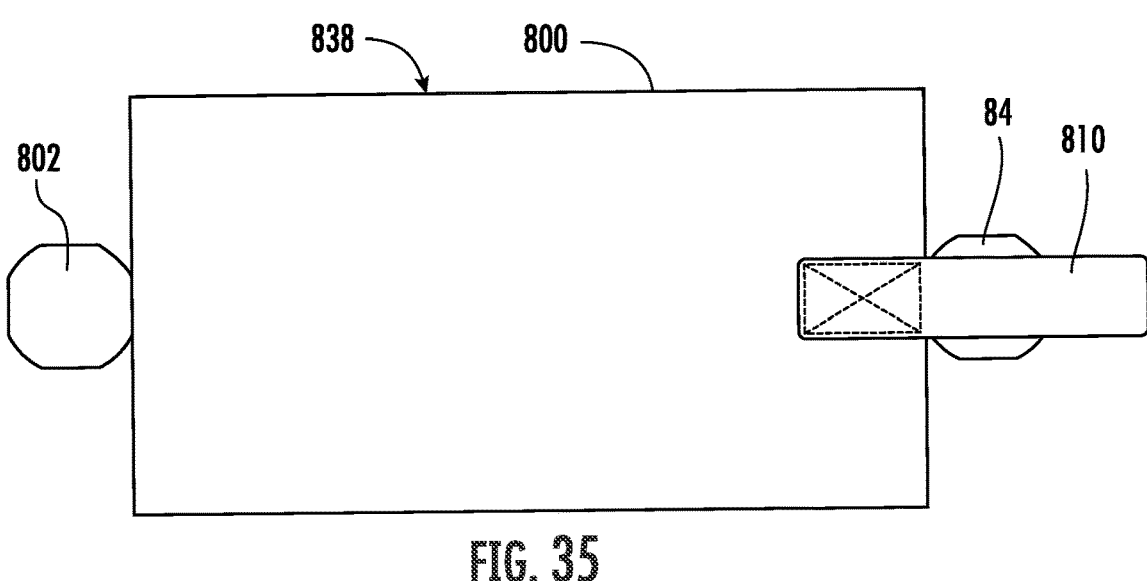
FIG. 35 is a bottom view of the example tube pouch of FIG. 31 prior to assembly completion.
Figure 36:
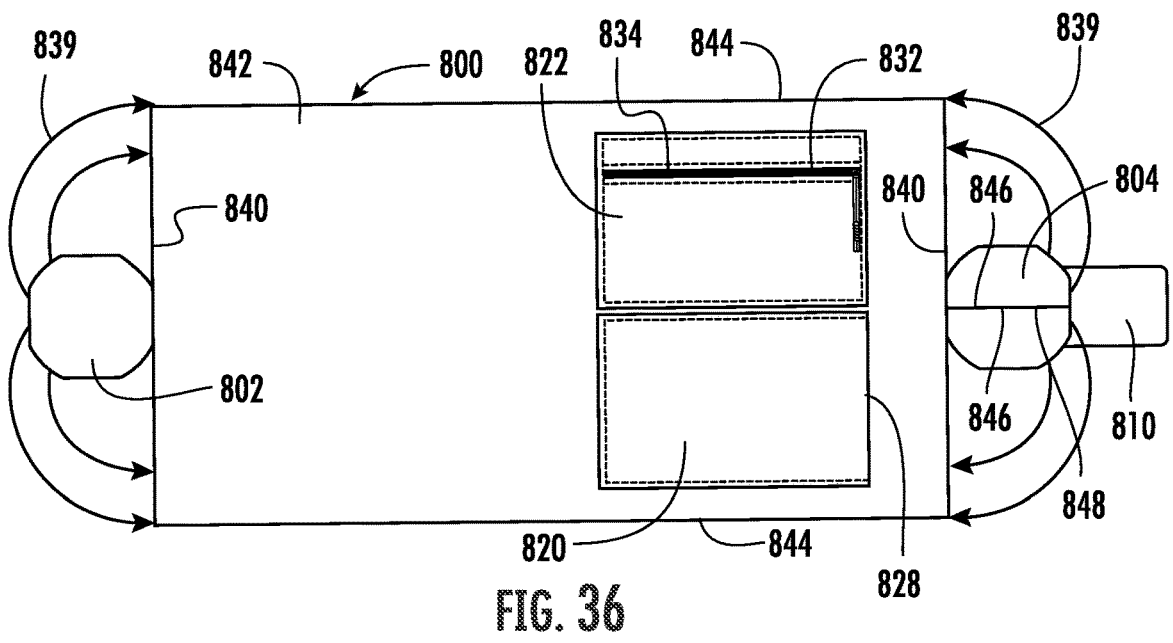
FIG. 36 is a top view of the example tube pouch of FIG. 31 prior to assembly completion.

FIGS. 35 and 36 are bottom and top views of pouch 353-1 prior to outer wall 800 being joined to end caps 802, 804 by stitching or other connection methods and prior to the inclusion of zipper 808. As shown by FIGS. 35 and 36, outer wall 800 and endcap's 802, 804 may be formed or cut from a single continuous piece of material or panel 838. As shown by arrows 839 in FIG. 36, edges 840 of the central rectangle 842 of material are butted to edges of endcap 802, 804 and cross stitched. As discussed above, edges 844 of the rectangle 842 extend parallel to one another and are selectively closed by a zipper secured to an inner surface of outer wall

800 along edges 844. The zipper further extends down along the opposite edges 846 of the slit 848 extending across endcap 804.

Figure 37:
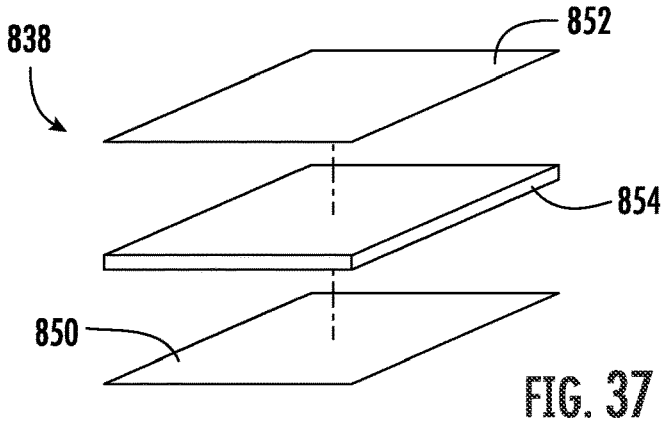
FIG. 37 is an exploded perspective view of an example laminate construction of an outer wall of the example tube pouch of FIG. 31.

FIG. 37 is an exploded view illustrating the different layers of material forming the panel 838 used to form outer wall 800 and end caps 802, 804. Panel 838 comprises a lamination or bonding of multiple layers such that there is no loose fabric or material between the layers. Such layers comprise interior layer 850, exterior layer 852 and intermediate layer 854. Interior layer 850 forms the interior surface of outer wall 800 and end caps 802, 804. In some implementations, interior layer 850 may be formed from a soft material such as a polyester. Exterior layer 852 forms the exterior of tube pouch 353-1 and is formed from a durable material such as a nylon. In some implementations, nylon is slightly stretchable.

Intermediate layer 854 is bonded to and sandwiched between layers 850 and 852. Intermediate layer 854 comprises a layer of padding or foam. Intermediate layer 854 provides tube pouch 353-1 with an enhanced degree of axial stiffness or resistance against axial compression. In some implementations, tube pouch 353-1 when supported on its axial ends between a pair of flat plates can withstand a vertical load (the weight exerted by the top plate and any additional weight on the plate) of at least 1 pound before the outer walls 800 inwardly bending or creasing. As a result, tube pouch 353-1 may be more easily pushed from axial end 809 into and along tube 406 with a reduced likelihood of tube pouch 353-1 bending or bunching up as it is being pushed into tube 406.

At the same time, intermediate layer 854 is resiliently compressible in a radial direction, perpendicular to the longitudinal axis or centerline of tube pouch 353-1. As a result, the outer surface of tube pouch 353-1 may be inwardly compressed as it is being inserted to facilitate sliding movement of tube pouch 353-1 within the interior of tube 406 and past any surface obstructions along the interior of tube 406. In some implementations, the outer surface of tube 353-1 may be coated or otherwise provided with an outer surface that has a low degree or coefficient of friction with respect to the interior surface of tube 406. For example, in some implementations, the outer surface may be coated with a polytetrafluoroethylene (TEFLON) material to further facilitate the pushing of tube pouch 353-1 axially along the interior of tube 406.

In some implementations, intermediate layer 854 is formed from neoprene and has a thickness of at least 1 mm and no greater than 5 mm. In other implementations, intermediate layer 854 may be formed from other materials and of other thicknesses yet providing to pouch 353-1 with the above-noted axial stiffness. In the example illustrated, intermediate layer 854 may provide a majority of the axial stiffness of tube pouch 353-1. In other implementations, a greater portion of the axial stiffness of tube pouch 353-1 may be provided by the other layers forming panel 838.

Figures 39, 41, 42:
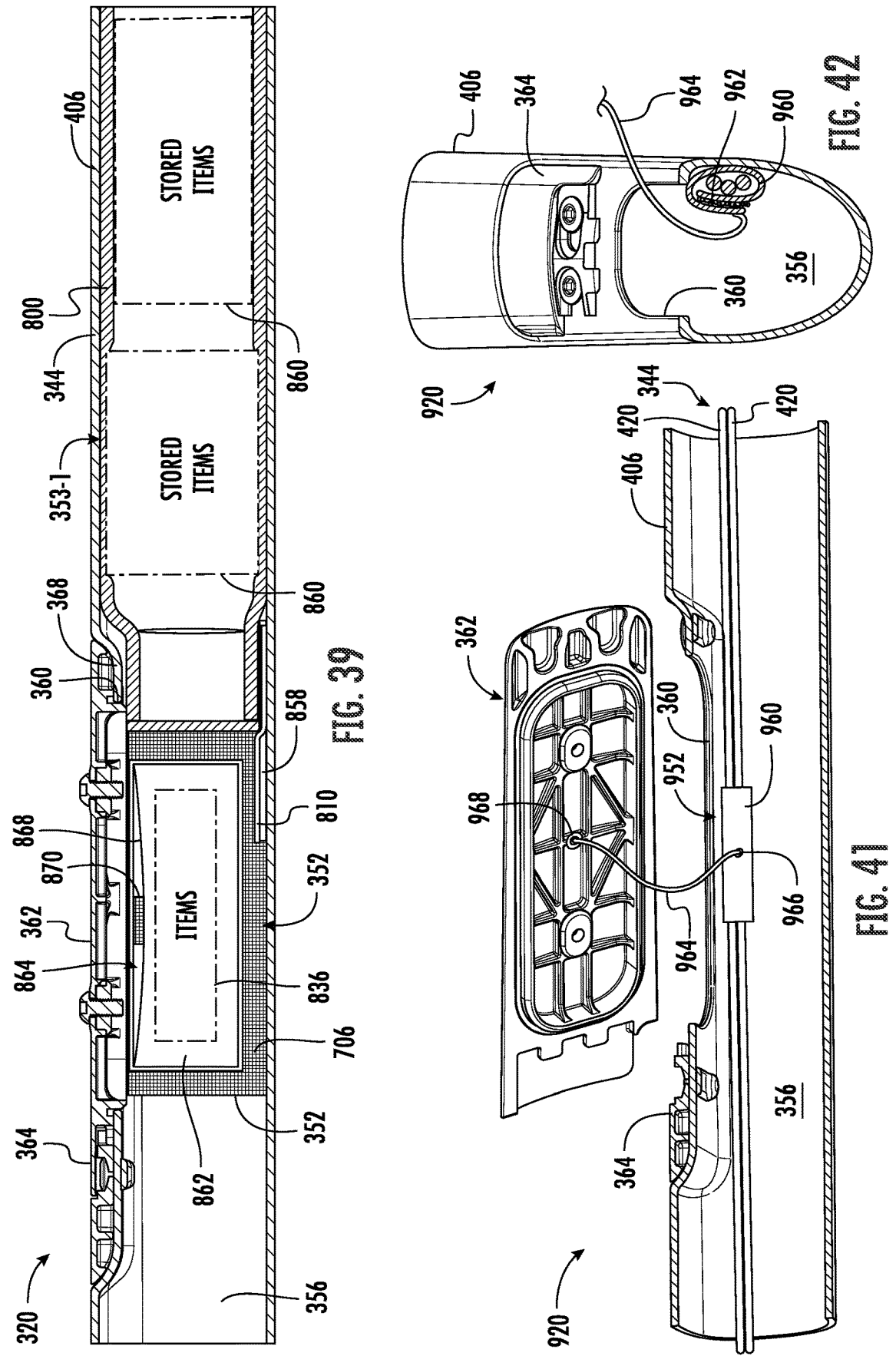
FIG. 39 is a sectional view of the portions of the example bicycle FIG. 8 illustrating the example tube pouch position within the example tube.
FIG. 41 is a sectional view of portions of an example bicycle, FIG. 41 illustrating an example cable retainer with a removed cover.
FIG. 42 is a cross-sectional view of the example bicycle of FIG. 41.

FIG. 38 illustrates insertion of tube pouch 353-1 through access opening 360 and along tube 406. As shown by FIG. 38, the axial stiffness of tube pouch 353-1 facilitates pushing of tube pouch 353-1 through access opening 360 and along tube 406. FIG. 39 is a sectional view of portions of the example bicycle 320 illustrating cover 362 closing access opening 360, latch 364 in a latched state, cable retainer 352 retaining cables 420 of cabling 344 adjacent the upper interior side of tube 406, and tube pouch 353-1 inserted into tube 406.

As shown by FIG. 38, in addition to providing to pouch 353-1 with an axial stiffness to facilitate pushing of tube pouch 353-1 along tube 406, the resilient compressibility of outer wall 800, provided by the padding or foam layer 854, may serve two additional functions. First, the resilient compressibility of outer wall 800 enables wall 800 to be compressed inwardly (towards the tube interior), facilitating the squeezing of those portions of tube pouch 353-1 that extend below recessed portion 368 of tube 406. As a result, may once again expand to a larger state or shape once moved past recessed portion 368 while those portions remaining ops to recessed portion 368 remain compressed and grip recessed portion 368 to assist in retaining the axial position of tube pouch 353-1 within tube 406, resisting accidental or inadvertent axial movement of tube pouch 353-1 within tube 406.

In some implementations, tube pouch 353-1 is dimensioned so as to have an outer cross-sectional dimension (diameter) substantially equal to the internal diameter of tube 406 such that outer wall 800 closely fits against the interior surfaces of tube 406 even in those portions of tube 406 beyond recessed portion 368, taking full advantage of the available volume within tube 406. In one example implementation, the generally cylindrical shape of tube pouch 353-1, when not compressed inwardly or stretched outwardly, has and outer diameter that is at least 75% of the inner diameter of tube 406 in those portions of tube 406 beyond recessed portion 368. In some implementations, tube pouch 353-1 has an outer diameter greater than the distance separating recessed portion 368 in the opposite interior surface of tube 406.

Second, the resilient compressibility of outer wall 800 enables outer wall 800 to be compressed outwardly (from the tube interior), permitting larger items to be squeezed into the interior of tubular pouch 353-1. The resilient nature of outer wall 800 causes outer wall 800 to squeeze about and grip the stored items 860 shown in broken lines). As a result, the stored items 860 are less likely to move relative to one another and are less likely to move relative to tube 406, reducing any tendency for such stored items to rattle or make undesirable noise while being stored within tube 406. In some implementations, the compressibility of outer wall 800 enables items to compress portions of outer wall 800 without impacting its outer diameter. Likewise, the compressibility of outer wiser for enables the outer wall 800 to compress inwardly without altering the inner diameter of outer wall 800.

In some implementations, tube pouch 353-1 may be dimensioned so as to more easily slide or move within tube 406 with less resistance from friction and/or outer wall 800 being inwardly compressed. In such implementations, tube pouch 353-1 may be secured actually within tube 406 in other fashions. In the example illustrated, pull tab 810 is provided with a hook pad 858 on his lower side for engaging portions of the loop pad 706 of cable retainer 352. As should be appreciated, in implementations where first portion 710 alternatively comprises a hook pad, pull tab 810 may alternatively be provided with a hook pad 858.

In the example illustrated in FIG. 39, cable retainer 352 comprise an additional panel 862 secured to a side of second portion 712, opposite to hook pad 708, by stitching, welds, adhesives or the like. Panel 862 forms a pocket 864 having a mouth 868 for the insertion of additional items 836, such as keys or the like. Mouth 868 faces access opening 360. In the example illustrated, mouth 868 is selectively closable by connector 870, such as a hook and loop fastener. In other implementations, mouth 868 may be selectively closable by other connectors such as a button, a toothed zipper, a plastic toothless zipper (ZIPLOC) or the like.

In some implementations, panel 862 may instead be secured to an additional panel which is releasably coupled to the side of the second portion 712 that is opposite to hook pad 708. In such implementations, the additional panel may be releasably coupled to the side of second portion 712 by hook and loop fastener or other connectors such that the additional panel and panel 862 forming the auxiliary pocket 864 may be selectively removed from cable retainer 352. In some implementations, panel 862 may be omitted.

FIG. 40 illustrates the removal of tube pouch 353-1 from tube 406. As shown by FIG. 40, a person may grasp pull tab 810 and lift and pull pull tab 810 to withdraw tube pouch 353-1.

Bicycle 920

FIGS. 41 and 42 illustrate portions of an example bicycle 920. FIGS. 41 and 42 illustrate an example of how cables 420 routed through a bicycle tube may be managed to facilitate insertion of a storage pouch or pouches, such as storage pouches 353. Bicycle 920 is similar to bicycle 320 described above except that bicycle 920 comprises cable retainer 952 in place of cable retainer 352. The remaining components of bicycle 920 that correspond components of bicycle 320 are numbered similarly and/or are shown in the prior figures.

Cable retainer 952 holds and retains cables 420 of cabling 344 along the interior sides and near a top of tube 406, proximate to the rim extending about access opening 360, during insertion of storage pouches, such as tube pouches 353. As shown by FIG. 42, cable retainer 952 comprises flexible panel 960, connector 962, and tether 964.

Flexible panel 960 comprise a strap or band configured to be wrapped about cables 420 of cabling 344 when in a closed state. Connector 962 releasably secures flexible panel 960 in the closed state. In one example, connector 962 comprises a hook and loop fastener having a hook pad and a loop pad which may be secured to another to form a sleeve for wrapping about cabling 344. The hook and loop connector enables and portions of panel 960 2B differently connected to one another at different locations to form a cable wrapping sleeve having an adjustable diameter to accommodate different numbers of cables.

Tether 964 comprise a cord, strap or the like having a first end 966 secured to flexible panel 960 by stitching, welds, adhesives or the like and a second end 968 secured to an underside of cover 362 such as with a knot, adhesives or other connection methods. During insertion of a storage container, such as tube storage 353-1, tether 964 and/or cover 362 may be pulled to lift the sleeve form by flexible panel 960 and the surrounded cables 420 towards and against the top interior of tube 406. While such cables 420 are held largely out of the way, tube pouch 353-1 (or two pouch 353-2) may be pushed into tube 406, sliding along the bottom floor of the interior of tube 406. During insertion, tube pouch 353-1 may further push those portions of cables 420 that are beyond access opening 360 upwards. After tube pouch 353-1 (and possibly tube pouch 353-2) have been inserted into tube 406, tether 964 may be inserted into the interior of tube 406 below access opening 360 and cover 362 may be positioned to close access opening 360 and latched in place by latch 364.

In the example illustrated, tether 964 further assists in connecting cover 362 to tube 406 when disconnected from access opening 360 and latch 364. In some implementations, tether 964 may not be connected to cover 362, but may form a pull cord or tab for moving cables 420 out of the way during the insertion of tube pouches 353.

Although the above-described cable retainers 352 and 952 are illustrated and described above as being employed with bicycle 320 and its tube storage 351, cable retainer 352 and 952 may be employed in any of the above-describe storage systems 50, 250 or other similar storage systems. Although the above-described tube pouches 353 are described and illustrated as being employed with bicycle 320 and its tube storage 351 and cable retainer 352, tube pouches 353 may be employed in other bicycles having different cable retainers are no cable retainers or in different bikers having different forms of a tube storage. Likewise, tube storage 351 and cable retainer 352 may be used with other storage containers other than to pouches 353.

Although each of the above-described storage systems with the above-described covers, latches, cable retainers and tube pouches are described with respect to a frame of a bicycle having pedals and an associated transmission and braking system, in other implementations, the above-described storage systems may be used in the frames and associated tubes of other similar wheeled vehicles. For example, the above-described storage system may likewise be employed in a tube of the frame of a unicycle, tricycle, four-wheeled cycle or the like. The above-described storage systems may be employed in in the frame tubes cycles (one, two, three or four wheeled cycles) which may additionally include a battery and motor for assisting with the propulsion of the cycle. The above-described storage systems may be employed in the frame tubes of multi-person cycles. The above-described storage systems may be employed in the frame tubes of vehicles having propulsion systems that do not rely upon peddling by a rider, such as electrical or internal combustion engine powered scooters or the like.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A bicycle comprising:
   a frame comprising a hollow tube having an interior and an access opening to the interior;
   a cover closing the access opening, the cover having an exterior facing away from an interior of the hollow tube and a bottom side facing the interior of the hollow tube; and
   a latch slidably coupled to the tube and releasably securing the cover to the tube, the latch being movable relative to the tube and the cover between a latched state and an unlatched state, wherein the latch remains coupled to the tube and is disconnected from the cover in the unlatched state, wherein the latch is movably coupled to the tube, wherein the latch, in the latched state, projects over and on an exterior side of a portion of the bottom side of the cover that is below, covered and concealed, from an outside of the tube, by the exterior of the cover to retain the cover to the tube, wherein the latch, in the unlatched state, does not project over the portion of the cover to permit movement of the cover relative to the tube, and wherein the cover and the latch have corresponding exterior surface shapes that are flush when the latch is in the latched state.

2. The bicycle of claim 1, wherein the latch is slidable relative to the cover in a direction perpendicular to a longitudinal axis of the tube between the latched state and the unlatched state.

3. The bicycle of claim 1, wherein the cover and the latch have perimeter exterior surfaces flush with adjacent exterior surfaces of the tube about the access opening.

4. The bicycle of claim 3, wherein the cover is completely detachable and separable from the tube in response to the latch being in the unlatched state.

5. The bicycle of claim 4, wherein the latch is configured to remain attached to the tube while the cover is completely detached and separated from the tube.

6. The bicycle of claim 5, wherein the cover comprises a first end portion having a slot extending along a first axis and a passage wider than the slot and extending above the slot, and wherein the tube comprises a knob having a shaft portion slidable within the slot along the first axis and a head portion wider than the slot and slidable within the passage so as to be insertable into and slidable along the passage and along the first axis while being captured within the passage against movement along a second axis perpendicular to the first axis.

7. The bicycle of claim 6, wherein the slot extends inwardly from the first end portion along the first axis and wherein the cover has a second end portion having a first edge, the latch having a second edge abutting the first edge to inhibit movement of the cover along the first axis, wherein the second slot portion has a height sufficient to permit pivoting of the cover relative to the head portion within the slot to disengage the first edge of the cover from the second edge of the latch when the latch is in the unlatched state.

8. The bicycle of claim 6, wherein the tube comprises a recess about the access opening, the recess having a length extending along the first axis, wherein the cover and the latch are received within the recess, the cover extending along a first portion of the length and the latch extending along a second portion of the length.

9. The bicycle of claim 8, wherein the recess has a floor about the access opening and wherein portions of the latch are sandwiched between the cover and the floor of the recess.

10. The bicycle of claim 9, wherein the latch comprises a second slot extending along a third axis perpendicular to the first axis and perpendicular to the second axis, the second slot having a slot width and wherein the tube comprises a second knob having a second shaft portion slidably received within the second slot such that the latch is slidable between the latched state and the unlatched state along the third axis and a second head portion in the second slot to inhibit movement of the latch along the second axis.

11. The bicycle of claim 10, wherein the recess has a depth and wherein the latch has a thickness equal to the depth.

12. The bicycle of claim 1, wherein the cover is completely detachable and separable from the tube in response to the latch being in the unlatched state.

13. The bicycle of claim 1, wherein the cover is tethered to the tube by a flexible cable, strap, or cord having a first end secured to and extending from an underside of the cover and a second end secured to and extending from a location within an interior of the tube.

14. The bicycle of claim 1, wherein the latch is offset from and does not overlie the access opening.

15. The bicycle of claim 1, wherein the latch is rotatable relative to the tube between the latched state and the unlatched state.

16. The bicycle of claim 15, wherein the tube comprises a circumferential recess and wherein the latch comprises a cylinder received within and rotatable about the circumferential recess.

17. The bicycle of claim 15, wherein the cover is completely detachable and separable from the tube in response to the latch being in the unlatched state.

18. The bicycle of claim 17, wherein the latch is configured to remain attached to the tube while the cover is completely detached and separated from the tube.

19. A bicycle comprising:

a frame comprising a hollow tube having an interior and an access opening to the interior, the hollow tube longitudinally extending along a longitudinal axis;

a cover closing the access opening; and a latch movably coupled to the tube on a longitudinal end of the access opening and longitudinally spaced from the longitudinal end of the access opening, the latch releasably securing the cover to the tube, the latch being slidable relative to the cover in a direction perpendicular to the longitudinal axis of the tube between a latched state and unlatched state.

20. A bicycle comprising:

a frame comprising a hollow tube having an interior and an access opening to the interior;

a cover closing the access opening; and a latch slidably coupled to the tube and releasably securing the cover to the tube, the latch being movable relative to the tube and the cover between a latched state and an unlatched state, wherein the latch remains coupled to the tube and is disconnected from the cover in the unlatched state, wherein the latch is slidable relative to the cover in a direction perpendicular to a longitudinal axis of the tube between the latched state and the unlatched state, wherein the cover and the latch have corresponding exterior surface shapes that are flush when the latch is in the latched state, wherein the cover and the latch have perimeter exterior surfaces flush with adjacent exterior surfaces of the tube about the access opening, wherein the cover is completely detachable and separable from the tube in response to the latch being in the unlatched state, wherein the latch is configured to remain attached to the tube while the cover is completely detached and separated from the tube, and wherein the cover comprises a first end portion having a slot extending along a first axis and a passage wider than the slot and extending above the slot, and wherein the tube comprises a knob having a shaft portion slidable within the slot along the first axis and a head portion wider than the slot and slidable within the passage so as to be insertable into and slidable along the passage and along first axis while being captured within the passage against movement along a second axis perpendicular to the the first axis.

* * * * *